(12) United States Patent
Shapiro et al.

(10) Patent No.: US 9,691,287 B1
(45) Date of Patent: Jun. 27, 2017

(54) GRAPHICAL METHOD TO SET VERTICAL AND LATERAL FLIGHT MANAGEMENT SYSTEM CONSTRAINTS

(71) Applicant: Rockwell Collins, Inc., Cedar Rapids, IA (US)

(72) Inventors: Geoffrey A. Shapiro, Cedar Rapids, IA (US); Laura Maxine Smith-Velazquez, Owings Mills, MD (US); Timothy J. Etherington, Hampton, VA (US); Nicholas M. Lorch, North Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/038,406

(22) Filed: Sep. 26, 2013

(51) Int. Cl.
*G08G 5/00* (2006.01)

(52) U.S. Cl.
CPC .................. *G08G 5/0039* (2013.01)

(58) Field of Classification Search
CPC ........ B64C 13/04; G01C 21/20; G08G 5/003; G08G 5/0039; G08G 5/0047; G08G 5/006
USPC ..................... 701/3, 122, 411, 413, 418, 467
See application file for complete search history.

(56) References Cited

U.S. PATENT DOCUMENTS

| 4,725,959 | A | | 2/1988 | Nagata | |
|---|---|---|---|---|---|
| 5,340,061 | A | * | 8/1994 | Vaquier | G08G 5/0039 244/175 |
| 5,715,163 | A | * | 2/1998 | Bang | G01C 23/00 701/14 |
| 5,818,423 | A | | 10/1998 | Pugliese et al. | |
| 5,926,790 | A | | 7/1999 | Wright | |
| 5,974,384 | A | | 10/1999 | Yasuda | |
| 6,163,744 | A | * | 12/2000 | Onken | G01C 23/00 340/979 |
| 6,173,192 | B1 | | 1/2001 | Clark | |
| 6,389,355 | B1 | * | 5/2002 | Gibbs et al. | 701/528 |
| 6,922,631 | B1 | * | 7/2005 | Dwyer | G01C 23/00 340/971 |
| 7,089,108 | B2 | | 8/2006 | Merritt | |
| 7,415,326 | B2 | | 8/2008 | Komer et al. | |
| 7,606,715 | B1 | | 10/2009 | Krenz | |

(Continued)

OTHER PUBLICATIONS

"Flight Path", Merriam-Webster.com, Nov. 2011, Merriam-Webster Online Dictionary.*

(Continued)

*Primary Examiner* — Mussa A Shaawat
*Assistant Examiner* — Nadeem Odeh
(74) *Attorney, Agent, or Firm* — Angel N. Gerdzhikov; Donna P. Suchy; Daniel M. Barbieri

(57) ABSTRACT

A method. The method includes receiving user input data from a user interface system. The user input data includes user gesture data, wherein the user gesture data is associated with one or more detected user gestures. The method also includes manipulating one or more graphical flight path elements based at least upon received user gesture data. The method further includes performing at least one flight path modification operation based at least upon one or more factors and the received user gesture data. The method additionally includes outputting updated graphical data to the user interface system, wherein the updated graphical data includes updated graphical flight path element data and updated graphical flight path data.

17 Claims, 13 Drawing Sheets

(56) References Cited

U.S. PATENT DOCUMENTS

| | | |
|---|---|---|
| 7,809,405 B1 | 10/2010 | Rand et al. |
| 7,881,832 B2 | 2/2011 | Komer et al. |
| 7,912,592 B2 | 3/2011 | Komer et al. |
| 8,139,025 B1 | 3/2012 | Krenz |
| 8,234,121 B1 | 7/2012 | Swearingen |
| 8,311,827 B2 | 11/2012 | Hernandez et al. |
| 8,380,366 B1* | 2/2013 | Schulte et al. .................... 701/3 |
| 8,515,763 B2 | 8/2013 | Dong et al. |
| 8,694,184 B1* | 4/2014 | Boorman ............... G01C 23/00 340/945 |
| 2003/0110028 A1 | 6/2003 | Bush |
| 2005/0203700 A1 | 9/2005 | Merritt |
| 2007/0233331 A1* | 10/2007 | Caillaud ............. G08G 5/0052 701/3 |
| 2007/0288242 A1 | 12/2007 | Spengler et al. |
| 2008/0065275 A1 | 3/2008 | Vizzini |
| 2008/0167885 A1* | 7/2008 | Judd .................... G08G 5/0013 701/120 |
| 2009/0076717 A1* | 3/2009 | Goutelard ............. G01C 21/00 701/122 |
| 2010/0030400 A1 | 2/2010 | Komer et al. |
| 2010/0030401 A1* | 2/2010 | Rogers .................. G01C 23/00 701/3 |
| 2010/0106346 A1* | 4/2010 | Badli ...................... G08G 5/003 701/3 |
| 2011/0199239 A1* | 8/2011 | Lutz ....................... G01C 21/00 340/995.14 |
| 2012/0147030 A1* | 6/2012 | Hankers .................. G01W 1/00 345/619 |
| 2013/0120166 A1* | 5/2013 | Kommuri ............ G08G 5/0013 340/971 |
| 2013/0280678 A1 | 10/2013 | Towers et al. |
| 2013/0338910 A1* | 12/2013 | Vilaplana ............. G06Q 10/047 701/122 |
| 2013/0345905 A1* | 12/2013 | Parthasarathy ................... 701/3 |
| 2014/0032105 A1* | 1/2014 | Kolbe et al. .................. 701/528 |
| 2014/0074323 A1* | 3/2014 | Andre et al. ..................... 701/3 |

OTHER PUBLICATIONS

Avidyne, Intro to IFD4400 GPS/NAV/COM, Jul. 5, 2012, Avidyne Corporation.*
ARINC, Advanced Flight Management Computer System—702A-1 Standard, Jan. 31, 2000, Aeronautical Radio, Inc.*
Flying The Boeing 767-300ER, Nov. 2010 <https://web.archive.org/web/20101105080310/http://flywestwind.com/Hangar/Aircraft_Files/FOMs/B763ERFOM.pdf>.*
737 Takeoff Roll and Climb Gradient, Jul. 2002, PPRuNe Forums <http://www.pprune.org/archive/index.php/t-59134.html>.*
If it is written: climb gradient of [ . . . ], 2007, Yahoo! Answers <https://answers.yahoo.com/question/index?qid=20071202151112AAOA0mQ>.*
What is Rate of Climb Referring to Cabin Pressure?, 2008, Yahoo! Answers <https://answers.yahoo.com/question/index?qid=20080524234906AAY41aM>.*
U.S. Appl. No. 13/248,814, filed Sep. 9, 2011, Barber.
U.S. Appl. No. 14/013,883, filed Aug. 29, 2013, Shapiro.

* cited by examiner

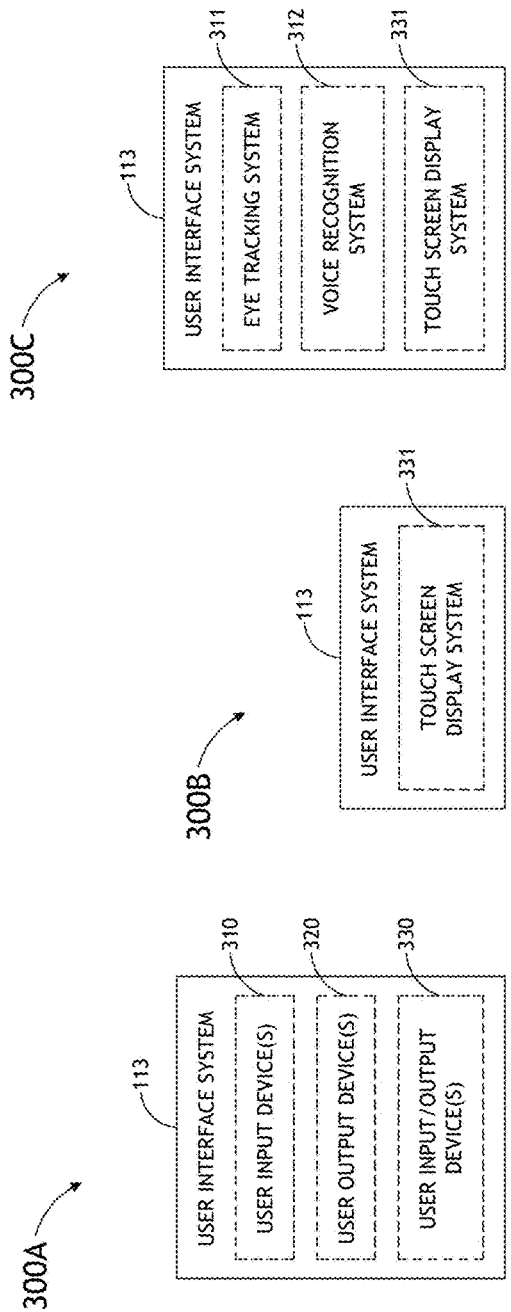

GRAPHICAL METHOD TO SET VERTICAL AND LATERAL FLIGHT MANAGEMENT SYSTEM CONSTRAINTS

CROSS-REFERENCE TO RELATED APPLICATIONS

The present application is related to U.S. patent application Ser. No. 14/038,439, filed on Sep. 26, 2013; the present application is related to U.S. patent application Ser. No. 29/468,159, filed on Sep. 26, 2013.

TECHNICAL FIELD

Embodiments of the invention are directed generally to human-machine interfaces and flight management systems associated with aircraft.

BACKGROUND

Existing avionics systems (such as existing flight management systems) lack a method or means of efficiently modifying a vertical navigation climb rate or vertical navigation descent rate. Existing flight management systems fail to accommodate pilot needs for when a pilot must deviate from a standard climb or descent profile to avoid turbulent conditions and obstructions or to accommodate air traffic control instructions. The shortcomings of current flight management systems often result in a pilot being required to engage in a manual flight control mode or result in the pilot being required to make a series of cumbersome selections with the interface of the flight management system. Similarly, existing avionics systems lack a method or means of efficiently modifying or setting an intercept heading when off course from a flight plan.

Therefore, it would be desirable to provide a method, system, and apparatus configured to allow a pilot to efficiently modify a vertical navigation climb rate or a vertical navigation descent rate; similarly, it would be desirable to provide a method, system, and apparatus configured to efficiently modify or set an intercept heading when off course from a flight plan.

SUMMARY

Accordingly, an embodiment includes a method. The method includes receiving user input data from a user interface system. The user input data includes user gesture data, wherein the user gesture data is associated with one or more detected user gestures. The method also includes manipulating one or more graphical flight path elements based at least upon received user gesture data. The method further includes performing at least one flight path modification operation based at least upon one or more factors and the received user gesture data. The method additionally includes outputting updated graphical data to the user interface system, wherein the updated graphical data includes updated graphical flight path element data and updated graphical flight path data.

Additional embodiments are described in the application including the claims. It is to be understood that both the foregoing general description and the following detailed description are exemplary and explanatory only and are not restrictive. Other embodiments of the invention will become apparent.

BRIEF DESCRIPTION OF THE DRAWINGS

Other embodiments of the invention will become apparent by reference to the accompanying figures in which:

FIGS. 3A-C show exemplary diagrams of user interface systems of some embodiments;

DETAILED DESCRIPTION

Figure 1:
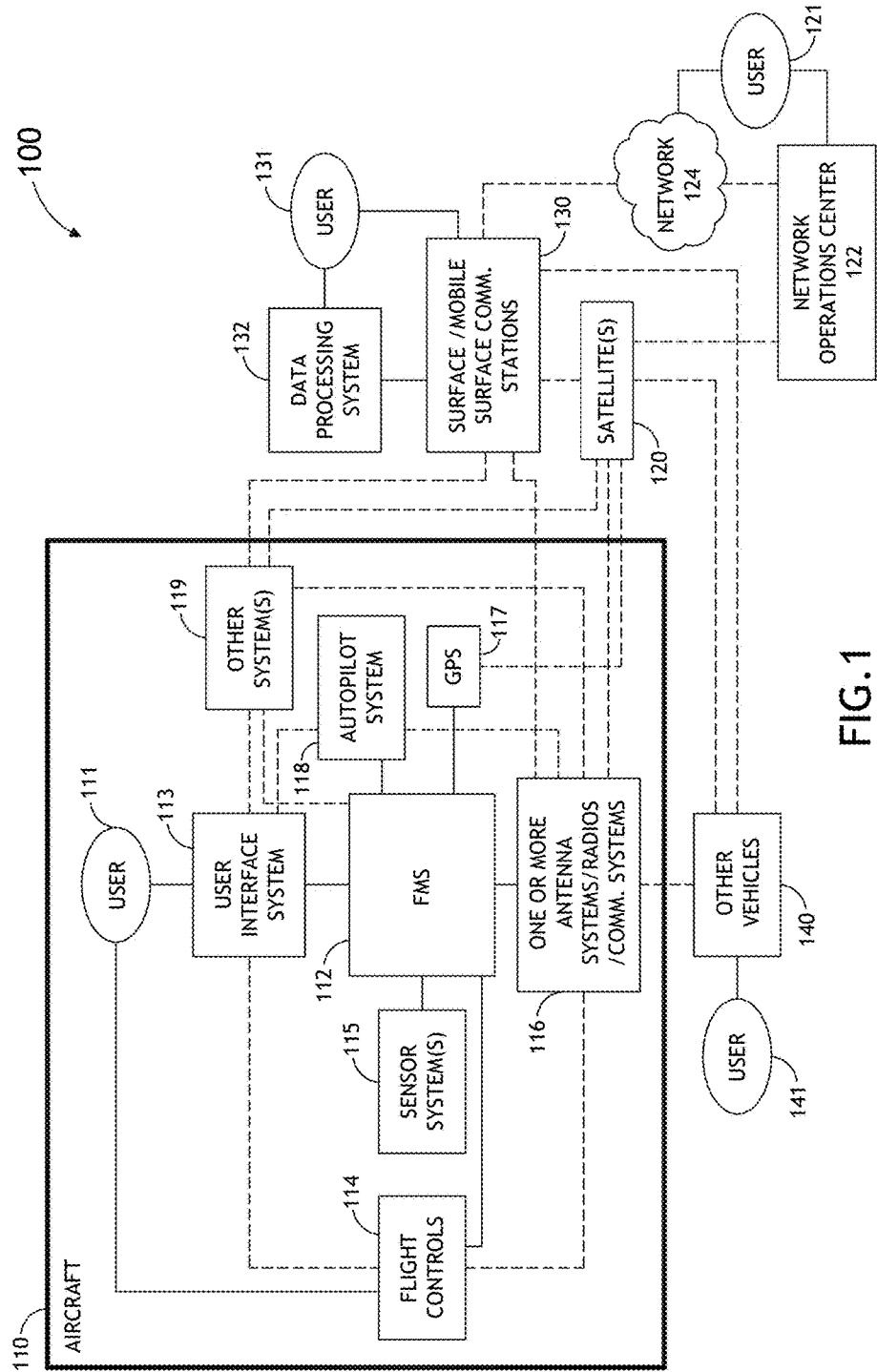
FIG. 1 shows an exemplary system topology.

Reference will now be made in detail to the subject matter disclosed, which is illustrated in the accompanying drawings. The scope of embodiments of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Embodiments of the invention include a method, system, and apparatus configured to allow a pilot to efficiently modify a vertical flight path, configured to allow a pilot to efficiently modify a lateral flight path, and configured to efficiently modify or set an intercept heading when off course of a flight plan.

Existing avionics systems (such as currently available flight management systems (FMSs)) lack a method to efficiently modify a vertical navigation climb rate or a vertical navigation descent rate. For example, most current flight management systems calculate a standard climb/descent rate, which often fails to accommodate pilot needs. Often, situations arise where pilots must deviate from a standard climb or descent profile (of existing FMS implementations) to avoid turbulent conditions or to accommodate air traffic control (ATC) instructions. As such, if the pilot does not accept an existing FMS's computed climb rate, the pilot has two options: a) abort the computed climb rate of the existing FMS and engage manual flight mode; or b) manually explore cryptic sub-pages of the user-interface of the existing FMS to set a climb limit.

The first option of existing implementations includes aborting the computed climb rate of the existing FMS climb and engaging manual vertical speed (VS) or flight level change (FLC) modes. Under this circumstance, all flight optimizations (such as, fuel optimizations) and performance calculations are suspended, which result in inaccurate estimates of fuel and time of destination.

The second option of existing implementations requires that the pilot "deep-dive" into sub-pages of the existing FMS to set a climb limit. This option requires significant pilot effort to complete and must be performed by trained pilots due to the cryptic interface of existing flight management systems. Furthermore, this existing method also does not necessarily show the pilot what effect such a set climb limit will have on the flight map; this results in difficulty for the pilot to ascertain and visualize the effect of the climb limit change.

A similar problem exists in setting an intercept heading when off course from a flight plan. Typically, after takeoff, pilots fly a runway heading until cleared by air traffic control to their first waypoint or to intercept the closest leg of the flight plan. (For example, a waypoint can refer to a three-dimensional point in space along a flight path or plan and can be described using a three-dimensional Cartesian coordinate system; or a waypoint can refer to a two-dimensional point of a surface, wherein a three-dimensional flight path or plan is transposed onto the surface such that the two-dimensional point can be described using a two-dimensional Cartesian coordinate system.) To accomplish flying the runway heading until cleared by air traffic control, the pilot typically suspends automation of existing flight management systems. As a result of suspending the automation of the existing flight management system, the existing FMS will lack accurate data as to an actual flight path (e.g., the FMS may lack information as to how the aircraft will join (or rejoin) the flight plan). Upon suspending the automation of an existing flight management system, a pilot typically will have a couple of options for how to interface with a current FMS. Currently, joining a flight plan with an existing FMS requires training and experience due to the non-intuitive interface of existing FMSs.

The following two scenarios also further describe some of the cumbersome interactions a pilot currently must perform to operate existing flight management systems.

As a first example, when a pilot is cleared by air traffic control direct-to a waypoint after takeoff, the pilot may be required to perform the following interactions with the existing flight management system: a) pushing a "Direct to" button located on the keyboard; b) moving a cursor to a correct waypoint listed on an on-screen dialog box (by using a cursor device); c) using a selection button to select the cleared-to waypoint; d) moving the cursor (via the cursor device) to an execute soft-key; and e) using the selection button to select the execute button. Additionally, under similar circumstances, if a particular direct-to waypoint is not currently in the flight plan, the pilot would also have to manually type in the waypoint identifier name on the keyboard.

As a second example, when the pilot is cleared by air traffic control to intercept a flight plan, the pilot may be required to perform the following interactions with the existing flight management system: a) ensuring a heading mode is engaged (and if the heading mode is not engaged, selecting the heading mode on a flight control panel); b) checking a map to calculate a correct intercept heading; c) changing a heading bug to intercept the flight plan (on the flight control panel); and d) engaging an "FMS NAV" (flight management system navigation) button on the flight control panel.

The above described problems and cumbersomeness of operating existing FMSs requires a great deal of pilot knowledge, training, experience, and time to perform.

Embodiments of the invention provide solutions to aforementioned problems, whereby a pilot can set flight management system goals easily through a highly graphical interface. For example, some embodiments of the invention are configured to allow a pilot to efficiently modify a vertical or lateral component of a flight path. Additionally, some embodiments of the invention are configured to allow a pilot to efficiently modify or set an intercept heading when off course of a flight plan.

Referring now to FIG. 1, an exemplary system topology 100 associated with exemplary embodiments of the invention is depicted. In exemplary embodiments as depicted in FIG. 1, the system topology 100 includes an aircraft 110, one or more satellites 120, one or more surface/mobile surface communication stations 130, and one or more other vehicles 140. In exemplary embodiments, the aircraft 110, the one or more satellites 120, the one or more surface/mobile surface communication stations 130, and the one or more other vehicles 140 are configured to be communicatively coupled to each other. Additionally, a connection between any two (or among more than two) of the aircraft 110, the one or more satellites 120, the one or more surface/mobile surface communication stations 130, and the one or more other vehicles 140 may be configured to be communicatively connected some of the time or all of the time (e.g., particular communication connections may be turned on or off at any given time, may lose or regain connectivity at any given time, or may remain connected for at least substantially all of a duration of time).

In exemplary embodiments as shown in FIG. 1, the aircraft 110 includes a plurality of subsystems and at least one user 111 (such as a pilot). As exemplarily depicted in FIG. 1, the plurality of subsystems include at least one flight management system 112; at least one user interface system 113; at least one flight controls 114; at least one sensor system 115; one or more antenna systems, radio systems, or communication systems 116; at least one global positioning system (GPS) 117; at least one autopilot system 118; other systems 119, or the like. In some embodiments, the at least one autopilot system 118 comprises an automatic flight control system ("auto-flight system"). Each system or subsystem of the aircraft may include one or more communicatively coupled components, such as any of the following: electrical components, electronic components, computer components, communications components, avionic components, navigational components, mechanical components, hydraulic components, pneumatic components, electro-mechanical components, sensors, optical components, acoustical components, or the like. For example, exemplary computer components may include one or more processors, memory, storage, cache, buffers, busses, software or computer code stored or loaded in a repository (such as storage, a cache, a buffer, a memory, or the like), networking components (such as a wired or wireless network card, one or more antennas, fiber optic cables, wires, or the like), or the like.

In some embodiments, it is further contemplated that a particular user of the aircraft 110 may comprise a remote user (e.g., a remote pilot, remote co-pilot, a remote operator, a remote co-operator, a remote co-navigator, a remote air traffic control user, a user of another vehicle, or the like), an automated computerized process, a semi-automated computerized process (e.g., a user-overridable computerized process), or some combination of at least one on-board user, at least one remote user, or at least one computerized process. For example, under some circumstances a remote user (e.g., an air traffic control user or a user of another vehicle) may be authorized (e.g., upon the occurrence of a predefined condition or otherwise) to remotely propose a flight path or plan, remotely direct a flight path or plan, remotely control the flight controls (such as via the flight management system 112), or remotely control the auto pilot system 118 of a particular aircraft. It is further contemplated in some embodiments that one or more systems of the aircraft 110 may be applied to vehicles other than aircraft or spacecraft.

In exemplary embodiments, the one or more communication stations 130 are communicatively coupled to at least one data processing system 132. In particular embodiments, the one or more communication stations 130 are further communicatively coupled to the one or more satellites 120, the aircraft 110, and to other vehicles 140. In contemplated embodiments, the one or more communication stations 130 comprise an air traffic control (ATC) communication station (e.g., an air traffic control tower and associated communications equipment (such as radio transmitters/receivers)); likewise, in some contemplated embodiments, the data processing system 132 comprises an air traffic control (ATC) data processing system 132. In some embodiments, the data processing system 132 and/or the one or more communication stations 130 include at least one user-interface system for at least one user 131. In contemplated embodiments, the at least one user 131 comprises at least one air traffic control (ATC) user (e.g., an air traffic controller). Additionally, in some embodiments communication station 130 may include or be communicatively coupled to a network operations center (NOC) 122; the NOC 122 may connect a particular type of communications (e.g., satellite communications or a particular satellite network) with one or more networks 124 (e.g., the internet, a portion of the internet (such as a particular or a secured optical fiber network), an intranet, or the like).

Still referring to FIG. 1, in some embodiments, the system topology 100 includes one or more other vehicles 140. The other vehicles 140 may be communicatively coupled to the aircraft 110, one or more satellites 120, one or more communication stations 130, one or more data processing systems 132, or the like. Additionally, it is contemplated that the aircraft 110 and the other vehicles 140 may be communicatively connected as an ad hoc network (such as a mobile ad hoc network). In some embodiments, at least one user 141 is configured to control one or more functions of a particular other vehicle 140; for example, the user 141 may comprise a driver, a navigator, a pilot, a copilot, a remote pilot, a remote copilot, an operator, a co-operator, a remote operator, a remote co-operator, or the like. It is further contemplated that in some embodiments, the other vehicles 140 may lack an on-board user, such that the other vehicles 140 are controlled by a remote pilot, a semi-automated computerized process, an automated computerized process, or some combination thereof.

For example, in some embodiments, one or more other vehicles 140 can comprise any number of aircraft (e.g., helicopters, airplanes, unmanned aircraft, blimps, or the like), spacecraft, surface vehicles (e.g., automobiles, trains, tanks, or the like), subterranean vehicles (e.g., subways, or the like), amphibious vehicles (e.g., hovercraft), aqueous vehicles (e.g., boats), submersible vehicles (e.g., submarines), vehicles located on or in proximity to another orbiting body, and/or the like.

Figure 2A:
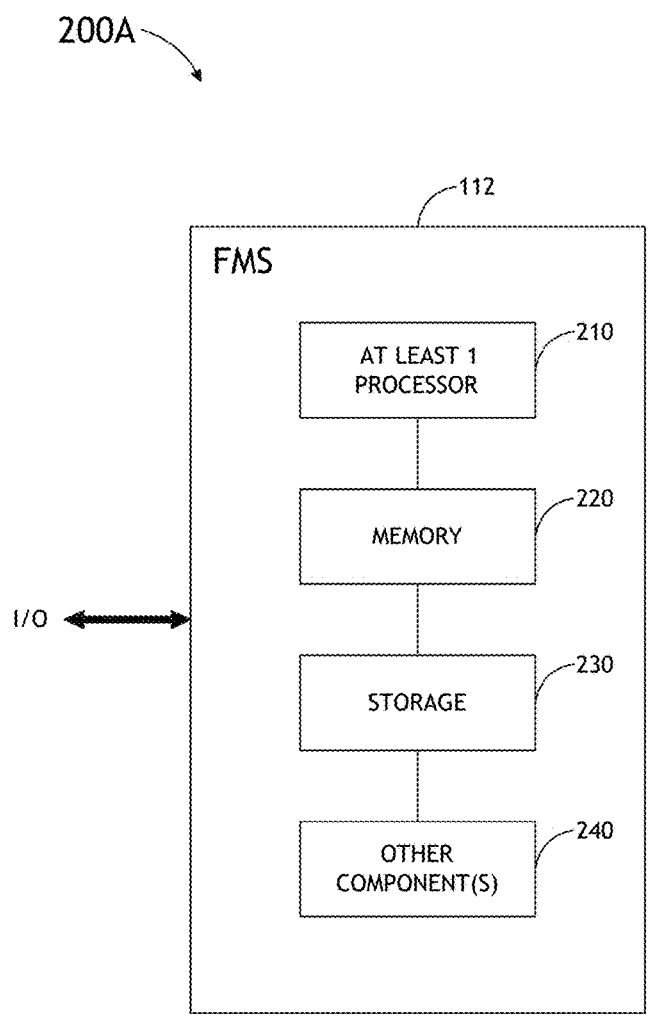
FIGS. 2A-B show exemplary diagrams of flight management systems of some embodiments.
Figure 2B:
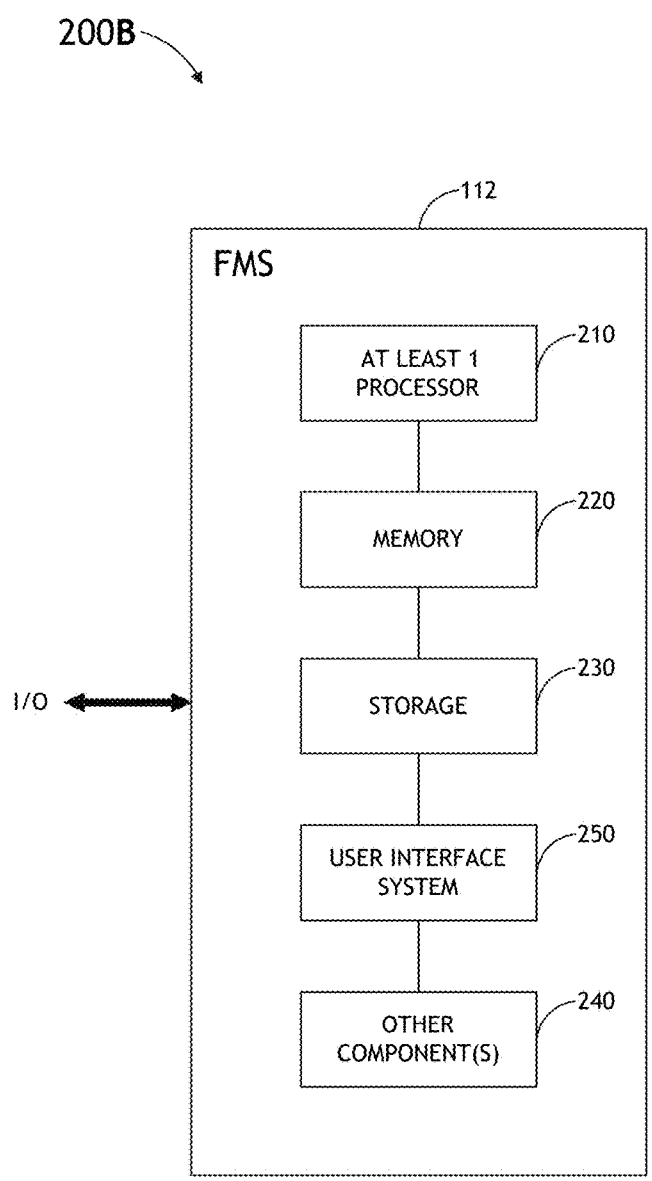

Referring now to FIGS. 2A-B, a flight management system (FMS) 112 of the aircraft 110 of exemplary embodiments 200A, 200B is depicted. In some embodiments, the flight managements system 112 is configured to perform any number of operations, including, for example: performing climb and descent rate calculations, performing fuel optimization calculations, performing aircraft performance calculations, receiving data from onboard sources (e.g., the user interface system 113) or off-board sources (e.g., a communications station 130, such as an air traffic control communications station), performing modified flight path or plan calculations, performing calculations to predict flight path or flight plan, outputting data (such as graphical data) to onboard or off-board destinations, or the like.

The FMS 112 of exemplary embodiments 200A, 200B includes a plurality of communicatively coupled components. For example, in the exemplary embodiment 200A, the FMS 112 includes at least one processor 210, at least one memory 220, at least one storage device 230, as well as other components 240. For example, in the exemplary embodiment 200B, the FMS 112 includes at least one processor 210, at least one memory 220, at least one storage device 230 (such as a hard-disk drive or solid-state drive), a user interface system 250, as well as other components 240. In some embodiments, other components 240 include, but are not limited to, any of the following: an automatic flight control system ("auto-flight system"); a bus; a cache; a display; a battery; a power source; wired, cabled, or wireless networking components (such as a networking card or antenna); digital or analog signal input/output ports; a removable storage media drive; removable storage media; firmware, software, or middleware; and/or the like. As shown in FIGS. 2A-B, the FMS 112 is configured to send and receive signals (such as digital input/output (I/O) signals or analog signals) to and from particular systems of the aircraft 110 (e.g., as shown in FIG. 1).

In some embodiments, the user interface system 250 of the FMS 112 may include the at least one user interface system 113 of the aircraft 110, may be in addition to the at least one user interface system 113 of the aircraft 110, may be linked with one or more particular user interface systems of the at least one user interface system 113 of the aircraft 110, and/or may be separate from one or more user interface systems of the at least one user interface system 113 of the aircraft 110.

Referring now to FIGS. 3A-3C, the user interface system 113 of the aircraft 110 of exemplary embodiments 300A, 300B is depicted. In some embodiments, one or more of the at least one user interface system 113 of the aircraft 110 may include, may be separate from, or may be linked with a user interface system 250 of the flight management system (FMS) 112. In some embodiments, the at least one user interface system 113 of the aircraft 110 includes at least one processor, storage, a memory, or the like.

As shown in FIG. 3A, a particular user interface system 113 of the exemplary embodiment 300A includes at least one user input device 310 or is configured to receive a digital and/or analog signal from at least one user input device 310. The user input device 310 can include a sensor (such as an optical sensor (such as a camera, a motion tracking sensor, or an eye tracking sensor), an electroencephalograph (EEG) sensor, or the like), a pointer device (such as a mouse, touch pad, trackball, or the like), a microphone, one or more buttons, a gyroscope, a joystick, or the like. The particular user interface system 113 of the exemplary embodiment 300A also includes at least one user output device 320 or is configured to output or transmit a digital or analog signal to at least one user output device 320. The user output device 320 can include a display, a projector (such as an image projector, a retina projector, or the like), one or more liquid crystal cells, one or more light emitting diodes (LEDs), a speaker, a bell, a gauge, a vibration-producing unit, or the like. The particular user interface system 113 of the exemplary embodiment 300A also includes at least one user input/output device 330 or is configured to output or transmit digital and/or analog signals to and receive digital and/or analog signals from at least one user input/output device 330.

Referring now to FIG. 3B, in some embodiments the user input/output device 330 comprises a touchscreen display 331.

Referring now to FIG. 3C, in some embodiments, a particular user interface system 113 of an exemplary embodiment 300C includes at least one touchscreen display system 331, an eye tracking system 311, and a voice recognition system 312. In some embodiments, the eye tracking system 311 is configured to track eye gestures, movement of a user's eye, a user's gaze, or the like. In some embodiments, the voice recognition system 312 is configured to recognize voice commands of a user.

Additionally, in some embodiments, portions of the user interface system 113 are implemented through the execution of software or firmware by a processor to present and/or output user interface (UI) data (which, when presented to the user, is perceivable by the user 111 through sensations or physiological responses (e.g., through visual sensations, audible sensations, tactile sensations, pressure sensations, olfactory sensations, response to released or introduced chemicals (e.g., neurotransmitters or pharmaceutical agents), response to neural stimulation, response to electrical stimulation, response to rapidly changing focused electromagnetic fields (e.g., alternating electromagnetic pulses), and/or the like). For example, in some embodiments the user interface information is presented to the user 111 as a graphical user interface (GUI) on a display or a touchscreen display 331.

Some embodiments of the invention include the at least one user interface system 113 being configured to present information to the user 111 from the flight management system (FMS) 112 and being configured to send information received from the user 111 to the FMS 112.

In some embodiments, the user interface system 113 comprises one or more of the following: a voice recognition system 311 (which may include one or more microphones, one or more speakers, or the like), an eye tracking system 312 (which may include a sensor, such as camera or the like), electroencephalograph (EEG) system, a touch-based technology system (e.g., a touch-screen display 331), or the like. In some embodiments, the touch-based technology system may include a tactile feedback system, a haptic technology-based system, a cutaneous technology-based system, touch-conductivity technology-based system, a multi-touch surface, a pressure-triggered screen, a stylus, a joystick, a keyboard, a key panel, a knob, a switch, a button, a pedal, a cursor control panel, a mouse, or the like.

Figure 4:
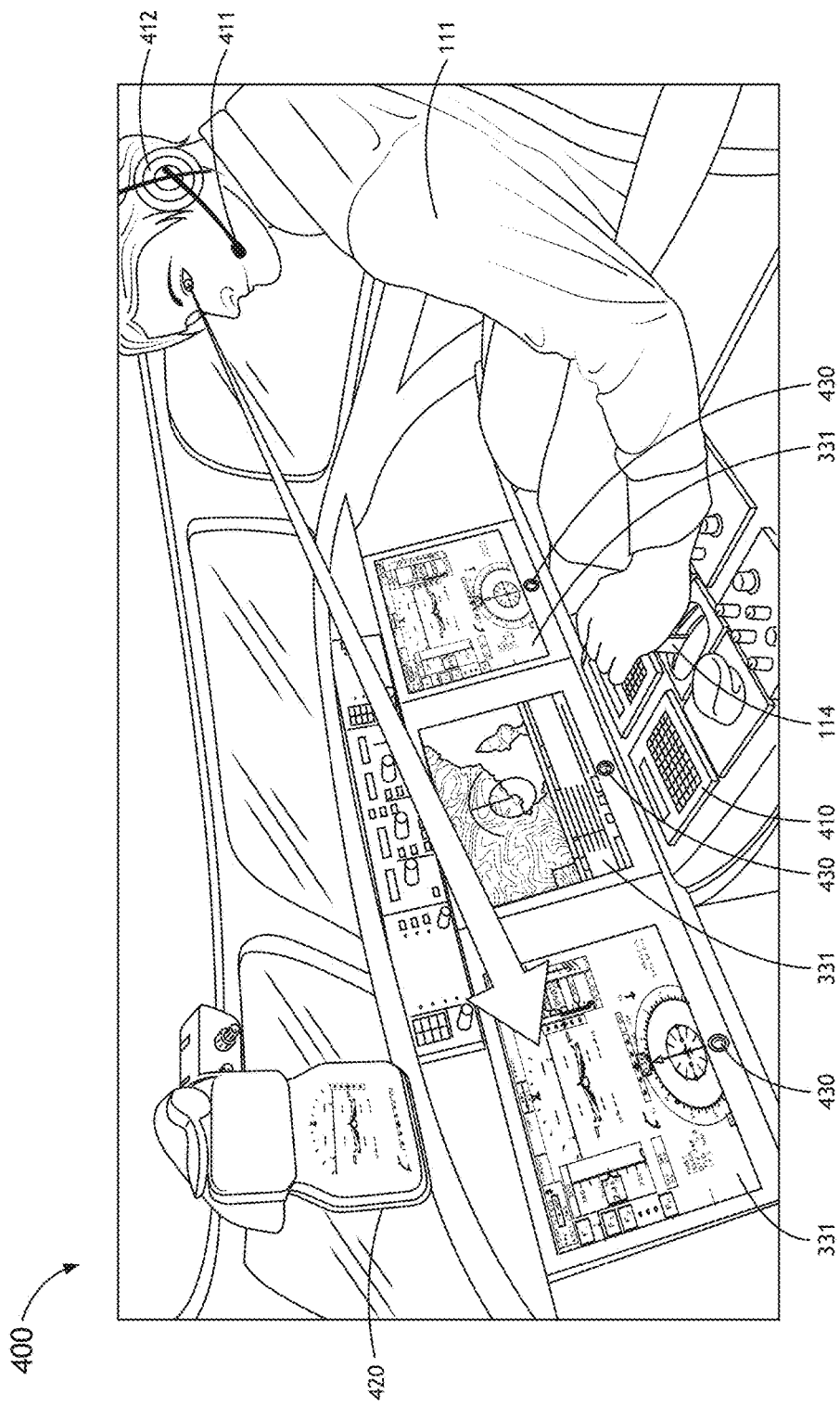
FIG. 4 shows a partial view of an exemplary cockpit of an aircraft.

Referring now to FIG. 4, a partial view of a cockpit of the aircraft 110 of an exemplary embodiment 400 of the invention is depicted. In some embodiments, a user 111 (e.g., a pilot, a copilot, a navigator, or the like) can interface with various components of the cockpit. In some embodiments, the cockpit includes a head-up display 420, at least one user interface system 113, flight controls 114, as well other instrumentation and components of a cockpit. For example, a particular user interface system 113 may include a plurality of displays (such as one or more touch-screen displays 331 (e.g., one or more touchscreen flight control panels) and a head-up display 420); a voice recognition system 312 (which can include at least one microphone 411 and at least one speaker 412); an eye tracking system 311 (which can include one or a plurality of optical sensors (e.g., a plurality of cameras 430)); a keyboard 410 of a user input device 310; or the like.

Figure 5:
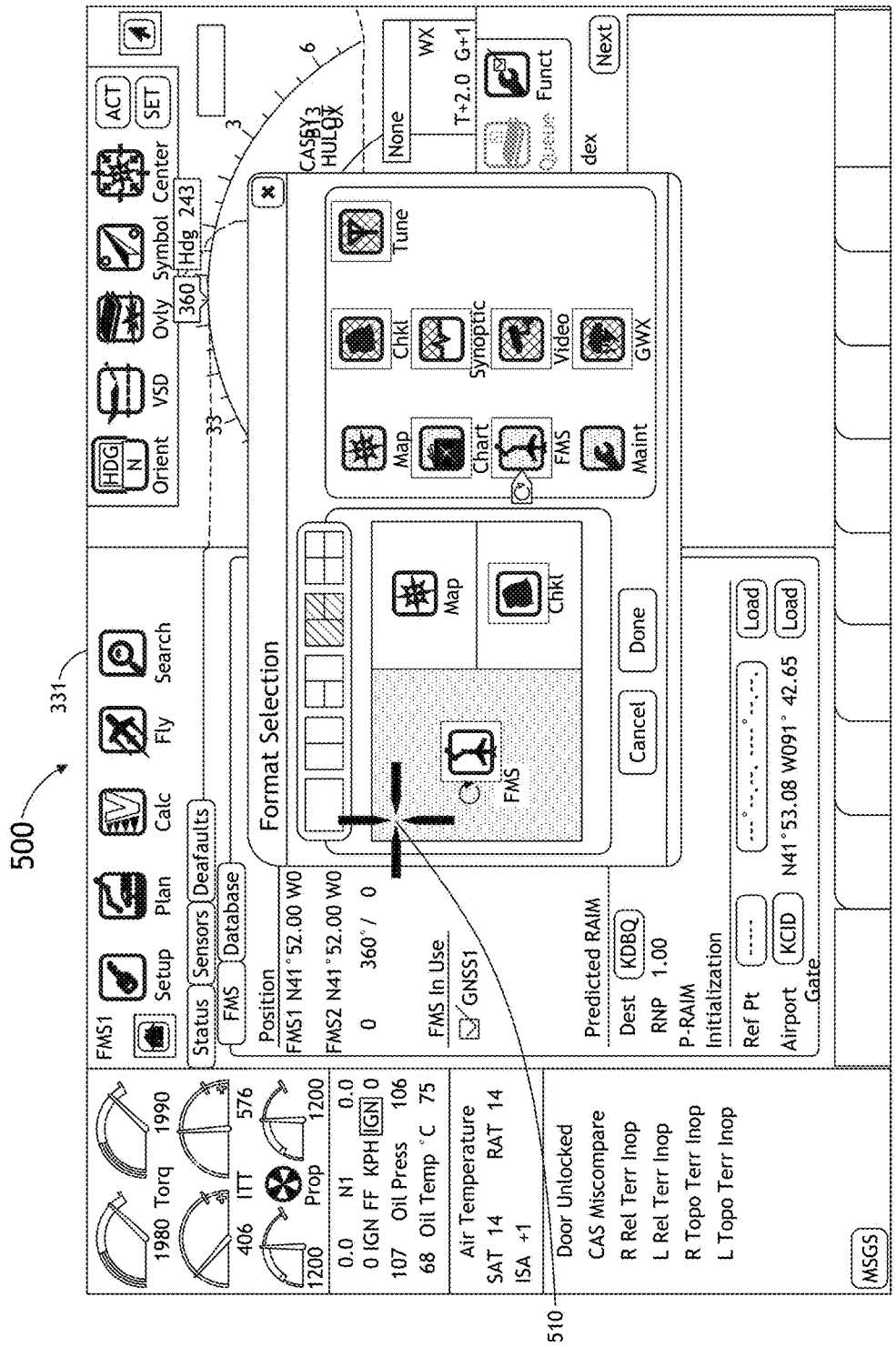
FIGS. 5-11 show exemplary screenshots of a touch graphical user interface associated with some embodiments.

Referring now to FIG. 5, an exemplary screenshot 500 of a touch-GUI of a particular touchscreen display system 331 of an exemplary embodiment is depicted. The screenshot 500 of the particular touch-GUI of the touchscreen display may present a multitude of user-selectable, user-manipulatable, or user-interactive data or information. For example, in some embodiments, the user 111 may press the touchscreen display system 331 at or in proximity to a point or area 510 of the touch screen display system 331. In some embodiments, the point or area 510 comprises an icon, a predefined region, a tile, a displayed region, or the like. For example, detecting a user interaction at or in proximity to the point or area 510 may select a flight management system user-interface screen to interactively present to the user 111. Additionally, in some embodiments the user 111 may perform a gesture (such as a touch-screen gesture) on or in proximity to the to the touch-screen display system. For example, in some embodiments the touch-screen display system 331 is configured to detect (at, on, or in proximity to a point or region of a surface of the touch-screen display system) single finger presses, multi-finger presses, single finger swipes, multi-finger swipes, multi-hand swipes, some combination thereof, or the like. Additionally, in some embodiments, the user 111 may select an icon, a predefined region, a tile, a displayed region, or the like through another device or subsystem (e.g., an eye tracking system 311 or voice recognition system 312) of the user interface system 113. In further embodiments, the user 111 may select an icon, a predefined region, a tile, a displayed region, or the like by using a combination of the touch-screen display system 331 and another device or subsystem (e.g., an eye tracking system 311 or voice recognition system 312) of the user interface system 113.

Figure 8:
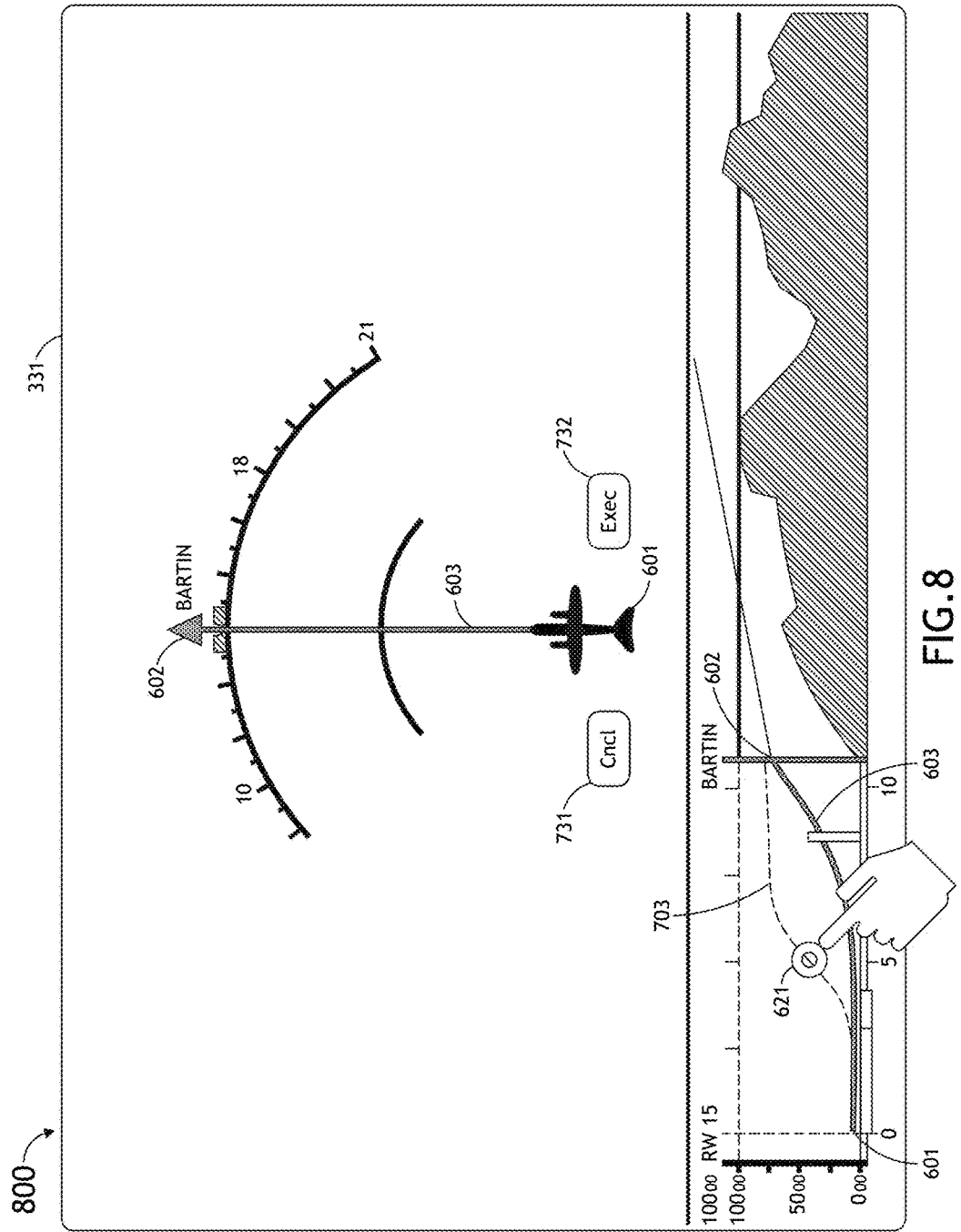
Figure 9:
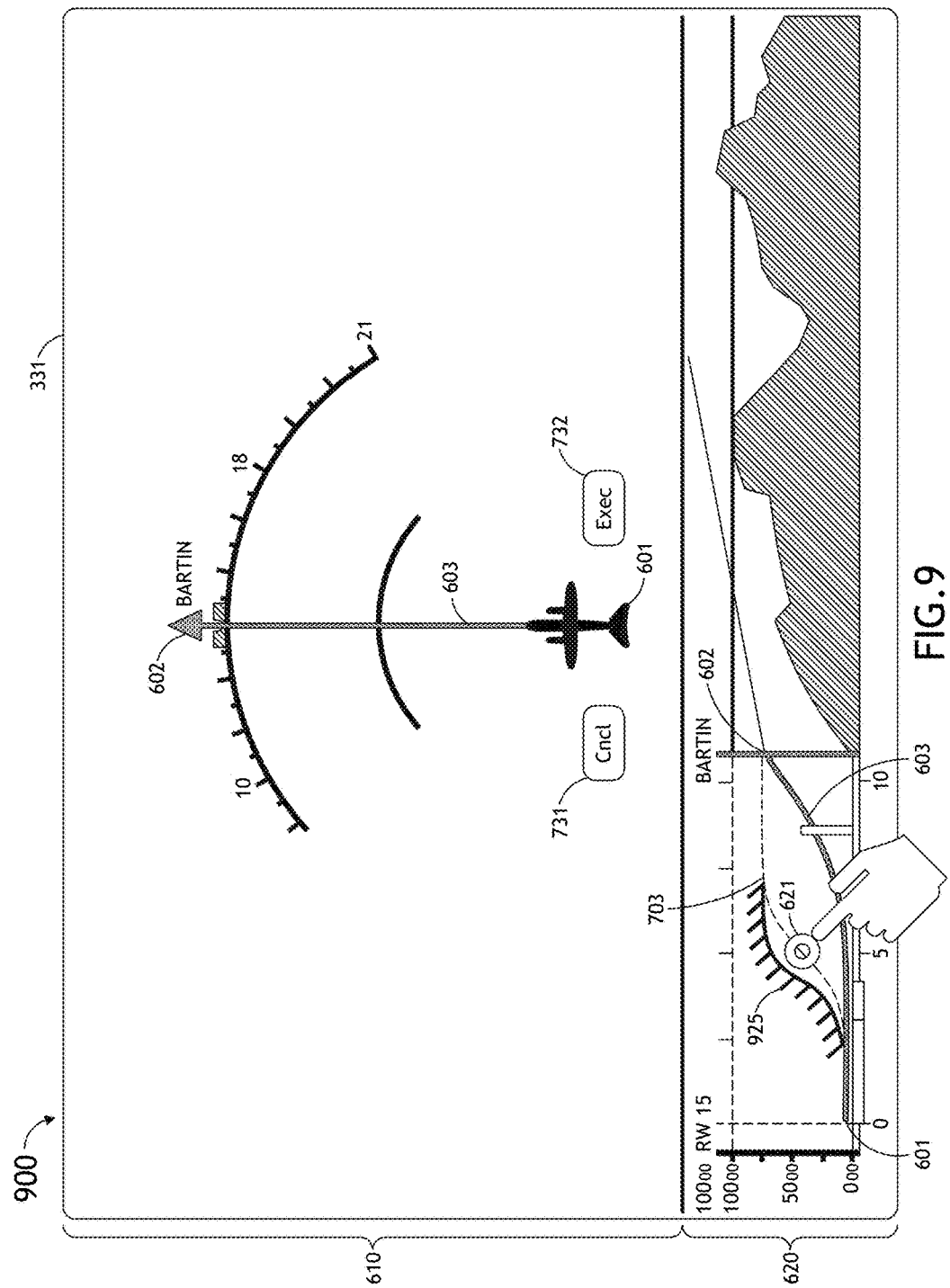
Figure 10:
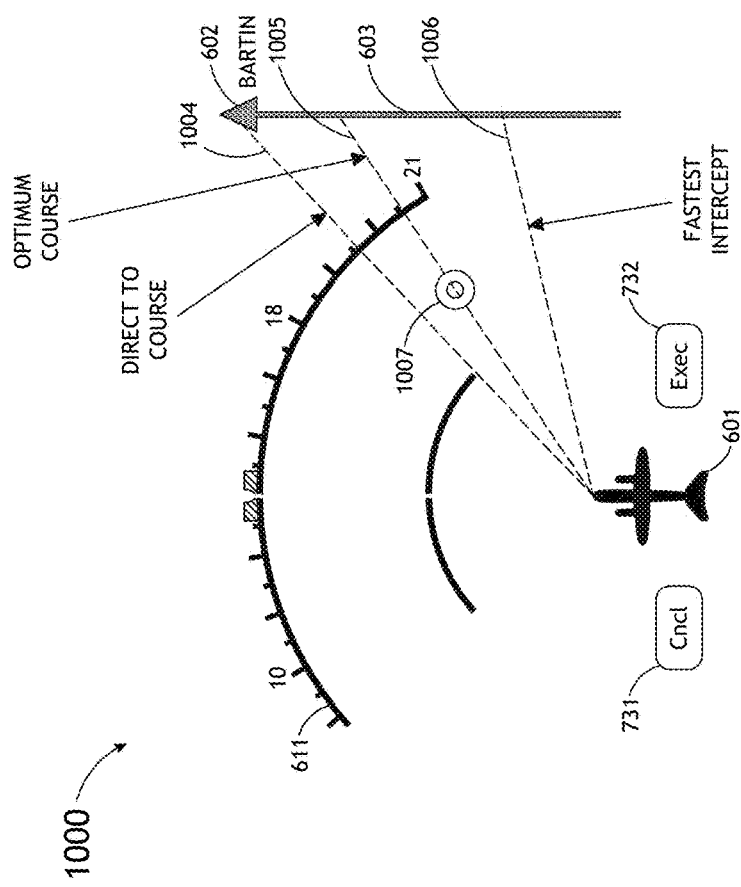
Figure 11:
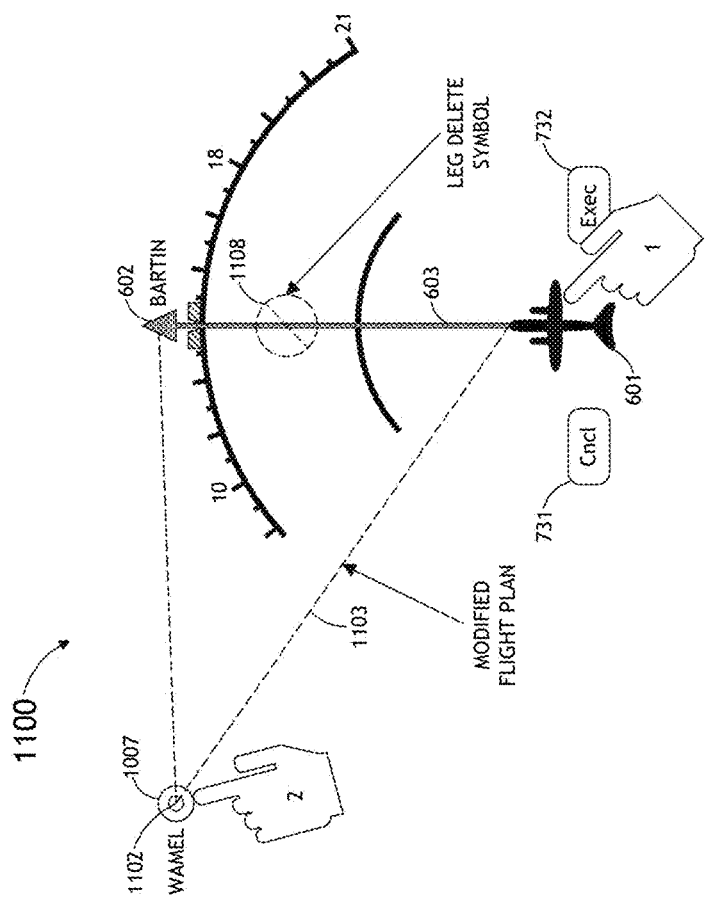

Referring generally to FIGS. 6-11, exemplary screenshots 600, 700, 800, 900, 1000, 1100 depict one or more touch-GUIs at various times of exemplary embodiments of the invention. FIGS. 6-9 depict exemplary screenshots 600, 700, 800, 900 associated with exemplarily embodied methods for performing one or more operations of modifying a vertical navigation path or plan. FIGS. 10-11 depict exemplary screenshots 1000, 1100 associated with exemplarily embodied methods for performing one or more operations of modifying a lateral navigation path or plan.

Figure 6:
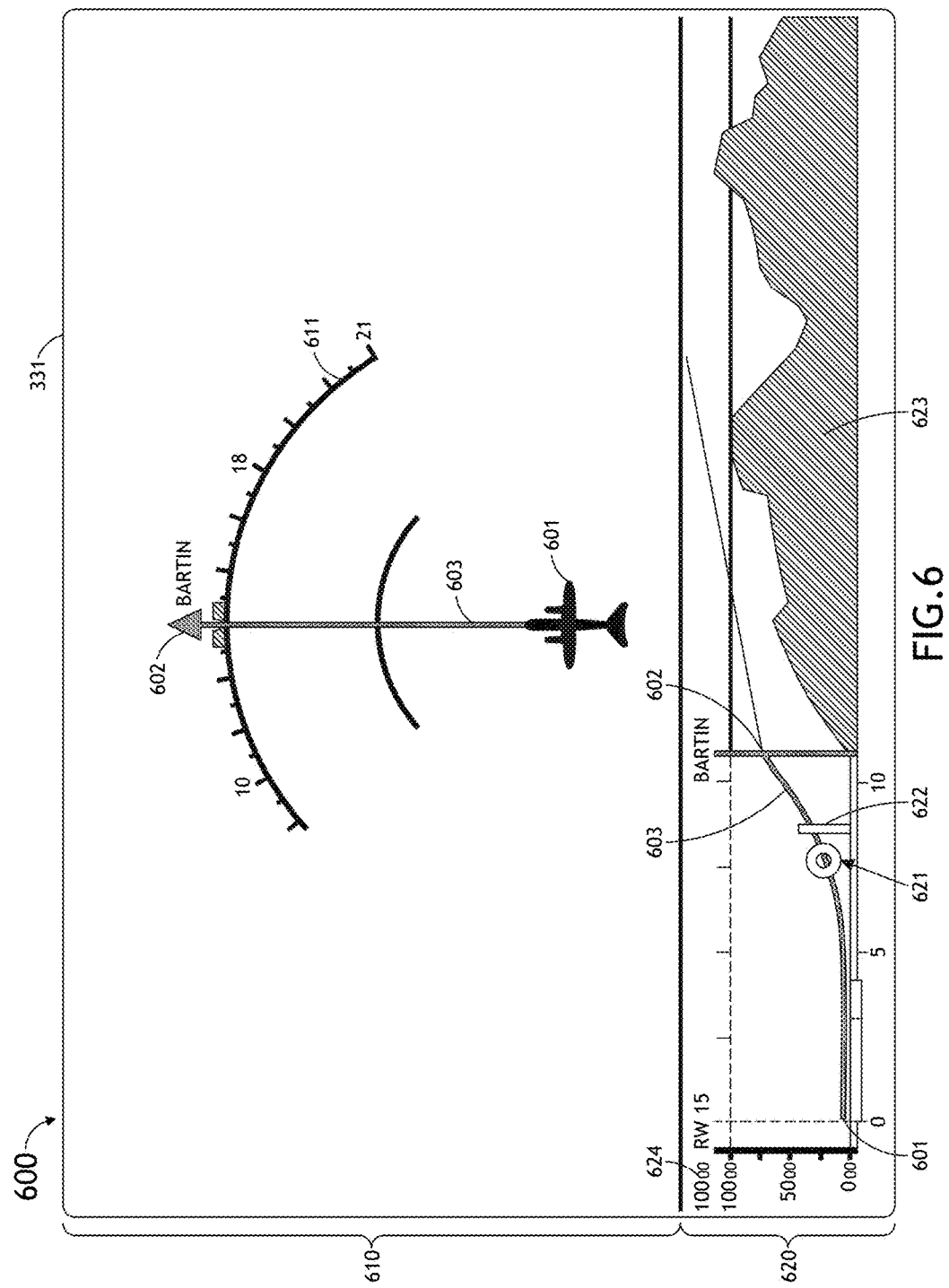

Referring now to FIG. 6, an exemplary screenshot 600 (or portion of a screenshot) of a touch-GUI of a particular touchscreen display system 331 is depicted. In some embodiments, the touchscreen display system 331 (or other user output device 320 or user input/output device 330 of the user interface system 113) presents a multitude of information or data (e.g., user-selectable information or data, user-manipulatable information or data, or interactive information or data) to one or more users (e.g., one or more of user 111, 121, 131, or 141). In some embodiments, the multitude of information or data comprises dynamic content, static content, or some combination of dynamic content and static content. As exemplarily depicted in FIG. 6, the multitude of information or data, which can be presented by the touch-screen display system 331, includes one or more graphical representations of a particular flight path or plan.

Figure 7:
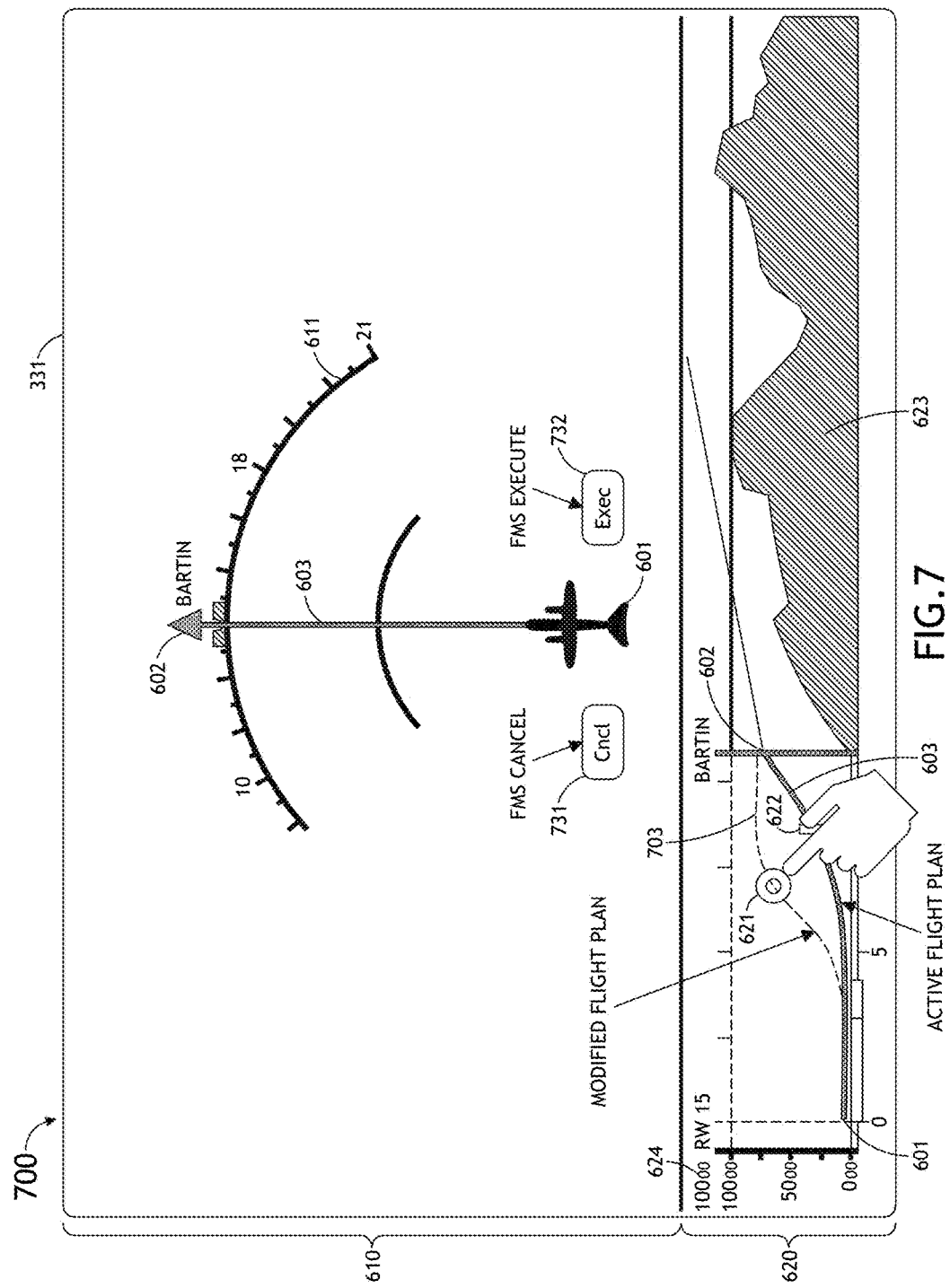

For example, as depicted in FIG. 6, the one or more graphical representations include a lateral graphical representation 610 and vertical graphical representation 620 of an active flight path or plan 603. Similarly, embodiments include the touchscreen display system 331 being configured to present a plurality of flight paths or plans (e.g., an active flight path or plan 603 and a modified flight path or plan 703 (as shown in FIGS. 7-9 and described in detail below)). Additionally, in contemplated embodiments, the one or more graphical representations include flight maps, which may be dynamically rendered and output by a flight map application.

As exemplarily depicted in FIG. 6, the particular flight path represents an active flight path or plan 603 (e.g., a currently set or currently programmed flight path). In some embodiments a particular touchscreen display system 331 is configured to display two or more graphical representations of a particular flight path (e.g., an active flight path or plan 603); for example, the two or more graphical representations of an active flight path or plan 603 may include the lateral graphical representation 610, which depicts a lateral component of the active flight path or plan 603, and the vertical graphical representation 620, which depicts a vertical component of the active flight path or plan 603.

As shown in FIG. 6, the one or more graphical representations (e.g., 610, 620) includes a multitude of information or data configured to be presented to the one or more users 111, 121, 131, 141 (e.g., a pilot onboard the aircraft 110 or a remote pilot) via the one or more graphical representations. For example, the multitude of information includes a current aircraft location 601, a waypoint 602 (wherein the exemplary waypoint 602 has an exemplary waypoint identifier of "BARTIN"), an active flight path or plan 603, heading information 611, a vertical flight path selector 621, a lateral flight path selector 1007 (see FIGS. 10-11, which are described in more detail, below), an obstacle 622, surface topology features 623, altitude information 624, other graphically represented information or data (such as a limit indicator 925 (see FIG. 9, which is described in more detail, below)), and the like.

Still referring to FIG. 6, in some embodiments, a user 111, 121, 131, or 141 (e.g., a pilot or navigator onboard the aircraft 110, a remote pilot, or a remote navigator) may select the vertical flight path selector 621 and drag the vertical flight path selector 621 in any direction by performing one or more gestures at, on, or in proximity to the touchscreen display system 331. For example, by pressing the touchscreen display 331 at a point in proximity to the active flight path or plan 603 as graphically represented in the vertical graphical representation 620, the user may select and substantially concurrently (or substantially simultaneously) activate the vertical flight path selector 621; then, the user may complete the gesture (or perform a subsequent gesture or command) to move the vertical flight path selector 621 to a point off of the active flight path or plan 603. This is described in further detail in the description of FIGS. 7-8, below.

Some embodiments include the touchscreen display system 331 being configured to detect the performance of the gesture. Additionally, upon detecting the performance of the gesture, the touchscreen display system 331 may dynamically (e.g., in at least substantially real time upon detection of new data or changed data) output, send, or transmit detected gesture data to one or more processors (e.g., one or more particular processors located throughout the system topology 100, such as at least one processor 210 of the flight management system 112). The one or more particular processor may then process the received gesture data and then output, send, or transmit updated graphical data to the touchscreen display system 331 in at least substantially real time. Upon receiving (by the touchscreen display system 331) the updated graphical data to present to the user (e.g., user 111) in substantially real time, the touch screen display system 331 dynamically displays the updated graphical data in response to the user's gesture of dragging the vertical flight path selector 621.

In some embodiments, the user interface system 113 (e.g., the touchscreen display system 331) is configured to present a plurality of flight paths or plans, and in further embodiments the user interface system 113 is configured to determine and present a plurality of flight paths or plans. For example, in some implementations, the plurality of flight paths or plans exemplarily comprises one or more of the following: an active flight path or plan 603; a modified flight path or plan (e.g., modified flight path or plan 703 of FIGS. 7 and 8, which is further described below); a preset flight path or plan; a proposed flight path or plan; an alternate flight path or plan; a suggested flight path or plan; an improved or optimized flight path or plan (e.g., a substantially optimal, an optimal, a better, a substantially best, or a best flight path or plan according to a variable, predetermined, or selected set of factors) as compared to another flight path or plan; a direct-to flight path or plan; a fastest intercept flight path or plan; a factor-of-comfort-based flight path or plan; a factor-of-safety-based flight path or plan; a boundary-condition flight path or plan based upon at least one factor of achievable flight plans or paths; another possible flight path or plan; or the like. For example, in particular embodiments, the flight management system 112 determines an improved or optimized flight path or plan for suggestion to the user 111, 121, 131, or 141 and outputs the improved or optimized flight path or plan to the user interface system 113; the user interface system 113 then presents the suggested improved or optimized flight path or plan to the user 111, 121, 131, or 141. At which point, the user 111, 121, 131, 141 may perform a user gesture in proximity to the user interface system 113 to execute, cancel, or modify the suggested improved or optimized flight path or plan. Likewise, some embodiments of the invention include a flight management system 112 configured to suggest and output a direct-to flight path or plan 1004, a fastest intercept flight path or plan 1006, and an improved or optimized flight path or plan (e.g., 1005) to the user input system 113 for presentation to the user 111, 121, 131, or 141. (See, e.g., FIG. 10, which is described in more detail, below)

For example, in some embodiments, an improved or optimized flight path or plan is based upon one or more factors (such as a goal, a set of goals, a goal-based factor, a set of goal-based factors (e.g., factors associated with achieving a goal), or the like) as compared to the active flight path or plan 603. In particular exemplary embodiments, the one or more goal-based factors comprise one or more factors which are related (e.g., causally related, correlated, determined to be related, predetermined as being related, having a likelihood of relation, probabilistically related, determined to be likely to be related, or the like) to achieving a particular goal (such as maximizing profit, minimizing cost, shortest path (distance), fastest path (time), safety, comfort, some weighted or prioritized combination thereof, or the like).

For example, in some embodiments, the one or more factors associated with determining a flight path or plan (such as an improved flight path or plan, a modified flight path or plan 703, 1007, or the like) comprise a set of constraints; in such embodiments, the constraints may include costs, resources, limitations, or the like. Some exemplary constraints may include fuel; labor; time; distance; comfort constraints (e.g., based upon not exceeding a maximum rate of cabin pressure differential change, not exceeding a maximum degree of vertical inclination, not exceeding a maximum acceleration or deceleration, not exceeding a maximum degree of lateral roll, avoidance of air turbulence, avoidance of undesirable weather systems, or the like); safety constraints (e.g., based upon a factor of safety that is a predetermined percentage above a predetermined limitation of the aircraft 110, such as a physical limitation of the aircraft or a performance limitation of the aircraft); aircraft longevity constraints (e.g., based upon reduction of aircraft stress (such as stress on components (e.g., wings, rivets, welds, exterior, engine(s), or the like)); altitude; cargo shelf-life; availability, speed, and/or quality of connection to a particular off-board communication system; physical obstacles; surface topology obstacles; airspace restrictions (e.g., proximity to or location within domestic airspace, foreign airspace, international airspace, friendly airspace, hostile airspace, restricted airspace, a no-fly zone, or the like); cost and/or resource effects to other flight plans of other aircraft; cost and/or resource effects to flight plans of a part or all of a fleet; cost and/or resource effects to another system, organization, or environment (such as a non-aircraft system, organization, or environment; a system, organization, or environment encompassing more than aircraft; or the like); or the like.

By further example, in embodiments which include a boundary-condition flight path or plan based upon at least one factor of achievable flight plans or paths, the at least one factor of achievable flight plans exemplarily comprises at least one of the following factors: a factor related to one or more attributes associated with physical limitations of the aircraft 110; a factor related to one or more attributes associated with a limitation of at least one particular passenger; a factor related to one or more attributes associated with a limitation which is external to the aircraft 110; or the like.

Referring now to FIGS. 7-8, exemplary screenshots 700, 800 of a touch-GUI of a particular touchscreen display system 331 of an exemplary embodiment are depicted. FIG. 7 exemplarily depicts a screenshot 700 at a point in time (e.g., after a point in time which is depicted in FIG. 6) where the user 111, 121, 131, or 141 (e.g., a pilot or remote pilot) has dragged the vertical flight path selector 621 off of the active flight path or plan 603 in order to avoid the obstacle 622, which is located along the active flight path or plan 603. Similarly, FIG. 8 exemplarily depicts a screenshot 800 at a point in time (e.g., after a point in time which is depicted in FIG. 7) where the user 111, 121, 131, or 141 (e.g., a pilot or remote pilot) has further manipulated or dragged the vertical flight path selector 621 to a subsequent point.

Still referring to FIGS. 7-8, in some embodiments, a user 111, 121, 131, or 141 (e.g., a pilot or navigator onboard the aircraft 110, a remote pilot, or a remote navigator) may select the vertical flight path selector 621 and drag the vertical flight path selector 621 in any direction by performing one or more gestures at, on, or in proximity to the touchscreen display system 331. For example, by pressing the touchscreen display 331 at a point in proximity to the active flight path or plan 603 as graphically represented in the vertical graphical representation 620, the user may select and/or activate the vertical flight path selector 621; then, the user may complete the gesture (or perform a subsequent gesture or command) to move the vertical flight path selector 621 to a point off of the active flight path or plan 603, wherein the point off of the active flight path or plan 603 can comprise a point along a modified flight path or plan 703, as shown in FIGS. 7-8. For example, the user 111, 121, 131, or 141 (e.g., a pilot or remote pilot) may drag the vertical flight path selector 621 to a point of a modified flight path or plan 703 in order to avoid the obstacle 622. In some embodiments, a user can manipulate two or more flight path selectors concurrently, sequentially, or non-sequentially by performing a compound gesture (e.g., a two-finger gesture, a two-hand gesture, or the like), an additional gesture (e.g., an eye tracking gesture, an additional touch gesture, or the like), a command (e.g., a voice command), some combination thereof, or the like.

Some embodiments include the touchscreen display system 331 being configured to detect the performance of the gesture by the user 111, 121, 131, or 141; upon detecting the performance of the gesture, the touchscreen display system 331 may dynamically (e.g., in at least substantially real time upon detection of new data or changed data) output, send, forward, route, or transmit detected gesture data to a processor (e.g., a processor of the user interface system 113, a processor of another system of the aircraft (such as at least one processor 210 of the flight management system 112), an off-board processor (e.g., a processor of a satellite 120, a communication station 130, a data processing system 132, a network operations center 122, another vehicle 140, or the like), some combination of processors thereof, or the like), another information handling device (not shown in FIG. 1) connected to the network 124, another data processing system (not shown in FIG. 1) connected to the network 124, or the like. The particular processor may process the gesture data and then output, send, forward, route, or transmit updated graphical data to the touchscreen display system 331 in at least substantially real time. Upon receiving (for example, by the touchscreen display system 331) the updated graphical data to present to the user (e.g., 111) in substantially real time, the touch screen display system 331 dynamically displays the updated graphical data in response to the user dragging the vertical flight path selector 621.

In further reference to FIGS. 7-8, some embodiments include determining (for example, by the flight management system 112 or by another element of the overall system topology 100) attributes (e.g., the shape or the curvature of the modified flight path or plan 703 which is presented to the user 111, 121, 131, or 141) of the modified flight path or plan 703 based upon one or more factors, such as a goal-based factor or a plurality of weighted or prioritized goal-based factors. For example, in some embodiments, at least one processor 210 of the flight management system 112 determines the shape of the modified flight path or plan 703 by performing a set of operations (e.g., algorithmic operations, simulation operations, computational operations, weighting operations, prioritization operations, some combination thereof, or the like), wherein a particular set of operations to be performed depend at least in part upon the particular goal-based factors currently being applied (or having been selected to be applied) to the modified flight path or plan 703. For example, a set of operations may include performing curve smoothing operations (such as by utilizing a Fourier approximation function), single- or multi-variate linear regression operations, linear programming operations (e.g., by optimizing (such as by maximizing or minimizing) by utilizing the simplex method), non-linear optimization operations, stochastic process operations, forecasting operations (e.g., by recursively forecasting based upon trailing actual flight path data for a predetermined trailing time period), or the like. For example, in a particular exemplary embodiment where the goal-based factors include a comfort constraint which includes a maximum rate of cabin pressure differential change constraint, the flight management system 112 outputs an acceptable modified flight path or plan such that the outputted acceptable modified flight path or plan conforms to acceptable rates (e.g., such as an average or median rate) at which the particular aircraft 110 could ascend or descend along the modified flight path or plan 703 without violating the maximum rate of cabin pressure differential change constraint. Additionally, in some embodiments which include a plurality of weighted or prioritized goal-based factors, outputting a particular acceptable modified flight path or plan, which conforms to the plurality of constraints, is determined by performing weighting or priority operations.

Still referring to FIGS. 7-8, the user 111, 121, 131, or 141 (e.g., a pilot) can manipulate (e.g., drag) the vertical flight path selector 621 in various directions as an updated acceptable modified flight path or plan (e.g., modified flight path or plan 703) is dynamically presented to the user 111, 121, 131, or 141. In some embodiments, as the user drags the vertical flight path selector across the touchscreen display system 331, the updated acceptable modified flight path or plan is dynamically updated such that the updated acceptable modified flight path or plan contains the current position of the vertical flight path selector 621 (e.g., the updated acceptable modified flight path or plan at least substantially corresponds to a particular acceptable modified flight path or plan which includes the current position of the vertical flight path selector 621).

Additionally, in some embodiments, the updated acceptable modified flight path or plan is dynamically updated and dynamically presented to the user 111, 121, 131, or 141 based upon the current position of the aircraft 110 in flight. In some embodiments, the user 111, 121, 131, or 141 can preview the dynamically updated acceptable modified flight path or plan in substantially real time. As such, if the user (e.g., the user 111, such as a pilot) determines to change the active flight path or plan 603 to the modified flight path or plan 703, the user can perform a gesture (e.g., a touch gesture) in proximity to an execute icon 732 (or perform another gesture (e.g., an eye tracking gesture), another command (e.g., a voice command), or the like) to execute the modified flight path 703 as being an updated or new active flight path or plan. As such, in exemplary embodiments, upon a user interface system's 113 detection or recognition of a user gesture or command to execute the modified flight path or plan 703, the user interface system sends a signal or data to a processor (such as at least one processor 210 of the flight management system 112) to execute the modified flight path or plan 703. Once the processor receives the signal or data, the processor (such as at least one processor 210 of the flight management system 112) processes the signal or data associated with the detection or recognition of the user execution gesture or command. The processor then sets the modified flight path or plan 703 as the current or new active flight path or plan; upon setting the modified flight path or plan 703 as the current or new active flight path or plan, the processor may output updated graphical data to the touchscreen display system 331 so that the executed flight path or plan is presented to the user as the active flight path or plan.

In further exemplary embodiments, the processor (such as at least one processor 210 of the flight management system 112) sends or forwards to one or more off-board systems, apparati, or devices (such as a communication station 130 (e.g., an air traffic control communication station), another vehicle 140, a data processing system 132, a component thereof (e.g., a processor thereof), some combination thereof, or the like) the signal or data associated with the detection or recognition of the user gesture or command to execute the modified flight path or plan 703. In further embodiments, the processor (such as at least one processor 210 of the flight management system 112) waits to finalize execution of the modified flight path or plan 703 until the processor receives approval (e.g., a notification of approval) or a receipt verification for execution of the modified flight path or plan 703 from at least one off-board system (e.g., an air traffic control communication station, or the like).

For example, in some embodiments, the user 131 (e.g., an air traffic controller) may receive a request for approval to execute the modified flight path or plan 703 from the user 111 (e.g., the pilot of the aircraft 110). In an exemplary embodiment, the request for approval is exemplarily routed from the flight management system 112 to the antenna system 116 to the communication system 130 to the user 131 (e.g., the air traffic controller); then, for example, the user 131 (e.g., the air traffic controller) may interface with a computing device of the communication system 130 to approve or deny the request for execution of the modified flight path or plan 703, and a notification of approval or a notification of denial is sent, forwarded, or routed to the flight management system 112 of the aircraft 110. In further embodiments, the user 131 (e.g., the air traffic controller) may also further modify the modified flight path or plan 703 or propose an alternate modified flight path or plan; and likewise, the further modified flight path or plan or proposed alternate flight path or plan may be routed to the flight management system 112 and user interface system 113 of the aircraft 110 to be presented to the user 111 (e.g., the pilot) for acceptance or approval.

In still further embodiments, an automated or semi-automated process of the system topology 100 (such as a process running on a computing device of the communication station 130) receives a request for approval to execute the modified flight path or plan 703 from the user 111, and the automated or semi-automated process issues a notification of approval or a notification of denial, which is sent, forwarded, or routed to the flight management system 112 of the aircraft 110.

Additionally, if the user (e.g., the user 111, such as the pilot) determines to cancel or discard the modified flight path or plan 703, the user can perform a gesture (e.g., a touch gesture) in proximity to a cancel icon 731 (or perform another gesture (e.g., an eye tracking gesture), another command (e.g., a voice command), or the like) to cancel and discard the modified flight path or plan 703. In some embodiments, cancelling or discarding the modified flight path or plan 703 maintains the active flight path or plan 603; while in other embodiments, upon cancelling or discarding the modified flight path or plan 703, an alternate flight path or plan may be proposed or presented to the user 111.

Referring now to FIG. 9, an exemplary screenshot 900 of a touch-GUI of a particular touchscreen display system 331 of an exemplary embodiment is depicted.

As shown in FIG. 9, the one or more graphical representations (e.g., 610, 620) includes a multitude of information or data configured to be presented to the one or more users 111, 121, 131, 141 (e.g., a pilot onboard the aircraft 110 or a remote pilot) through the one or more graphical representations. In some embodiments, the multitude of information or data includes a limit indicator 925, as well as other information or data previously described in reference to FIGS. 6-8, above (such as the current aircraft location 601, the waypoint 602, the active flight path or plan 603, the modified flight path or plan 703, heading information 611, the vertical flight path selector 621, the lateral flight path selector 1007 (see FIGS. 10-11 described in more detail, below) the obstacle 622, surface topology features 623, altitude information 624, other graphically represented information or data, or the like).

In some embodiments, one or more limit indicators (e.g., limit indicator 925) are presented to the user 111, 121, 131, or 141 by the user interface system 113 (e.g., the touchscreen display 331). In some embodiments and as shown in FIG. 9, the limit indicator 925 graphically indicates to a user 111, 121, 131, or 141 (e.g., a pilot of the aircraft 110, a remote pilot of the aircraft 110, an air traffic controller, or the like) a region in space (or a region in space-time) that contains points of unacceptable flight plans. For example, unacceptable flight paths or plans may include unachievable flight paths or plans (e.g., flight paths or plans which are beyond the physical limitations of the aircraft 110, or the like), flight paths or plans which fail to meet some or all of the goals or objectives of a set of goal-based factors, flight paths or plans which violate one or more constraints of a set of constraints, or the like. That is, the limit indicator 925 represents points or regions where moving a flight path selector (e.g., one or more of the vertical flight path selector 721 or the lateral flight path selector 1007) would result in a modified flight path or plan (e.g., modified flight path or plan 703 or 1103) which is unacceptable to a set of flight goals, is substantially impossible or physically impossible, is unsafe (e.g., to prevent an aircraft from approaching a determined or predetermined proximity to an obstacle 622, surface topology features 623, projectiles, a range of hostile weaponry, other vehicles 140, satellites 120, or the like), or the like. In exemplary embodiments having an implemented set of one or more goal-based factors, the limit indicator 925 would display (and be dynamically updated) to represent points in space which would violate one (or a threshold number of) constraints of the particular set of one or more goal-based factors. While it is fully contemplated that some embodiments include one or more limit indicators (e.g., limit indicator 925) being presented (e.g., drawn or graphically represented) on a lateral map, a vertical map, a two-dimensional map depicting some combination of vertical and lateral components, a three-dimensional map, a four-dimensional space-time map, or the like, other embodiments include alternate methods and means of presenting limit indicators. For example, in embodiments where a particular limit indicator is presented on a lateral map, the limit indicator may represent regions where the flight plan would enter or include a prohibited area, wherein the prohibited area may include or be based upon temporary flight restrictions, special use airspace, weather threat areas, or the like.

In some embodiments, when the user 111, 121, 131, or 141 attempts to drag the flight path selector to a point of a region of the limit indicator 925, the flight management system 112 performs a limit exceeded operation. For example, performing the limit exceeded operation may include at least one of the following: cancelling the flight path modification; setting the flight path selector at a point of an acceptable modified flight path or plan (e.g., a closest acceptable modified flight path or plan); alerting or notifying the user 111, 121, 131, or 141; requesting override authorization (e.g., requesting goal or constraint override authorization); requesting a modification to the set of one or more goal-based factors; or the like. Additionally, in some embodiments, performing the limit exceeded operation may include communicating information or data with an off-board system (e.g., communication station 130, such as air traffic control) or an off-board location. For example, performing a limit exceeded operation may include sending a request for override authorization from the flight management system 112 of the aircraft 110 to a user 131 (e.g., an air traffic controller) of the communication station 130; likewise, performing a limit exceeded operation may further include at least one of receiving approved override authorization or receiving disapproved override authorization from the communication station 130 (e.g., air traffic control).

For example, in some embodiments, the limit indicator 925 is based upon one or more factors (such as a goal-based factor or a set of goal-based factors). In particular exemplary embodiments, the one or more goal-based factors comprise one or more factors which are related (e.g., causally related, correlated, determined to be related, predetermined as being related, having a likelihood of relation, probabilistically related, determined to be likely to be related, or the like) to achieving a particular goal (such as maximizing profit, minimizing cost, shortest path (distance), fastest path (time), safety, comfort, some weighted or prioritized combination thereof, or the like).

For example, in some embodiments, the one or more factors associated with determining the limit indicator 925 comprise a set of constraints; in such embodiments, the constraints may include costs, resources, limitations, or the like. Some exemplary constraints may include fuel; labor; time; distance; comfort constraints (e.g., based upon not exceeding a maximum rate of cabin pressure differential change, not exceeding a maximum degree of vertical inclination, not exceeding a maximum acceleration, not exceeding a maximum degree of lateral roll, avoidance of air turbulence, avoidance of undesirable weather systems, or the like); safety constraints (e.g., based upon a factor of safety (e.g., one or more values (e.g., percentages) which exceed determined physical limitations of the aircraft 110, such as physical limitations of the aircraft or performance limitations of the aircraft, or the like); aircraft longevity constraints (e.g., based upon reduction of aircraft stress (stress on components (e.g., wings, rivets, welds, exterior, engine(s), or the like)); altitude; cargo shelf-life; availability, speed, and/or quality of connection to a particular off-board communication system; physical obstacles; surface topology obstacles; temporary flight restrictions or airspace restrictions (e.g., proximity to or location within domestic airspace, foreign airspace, international airspace, friendly airspace, hostile airspace, special use airspace, weather threat areas, restricted airspace, a no-fly zone, or the like); cost and/or resource effects to other flight plans of other aircraft; cost and/or resource effects to flight plans of a part or all of a fleet; cost and/or resource effects to another system, organization, or environment (such as a non-aircraft system, organization, or environment; a system, organization, or environment encompassing more than aircraft; or the like); or the like.

By further example, in embodiments which include the limit indicator 925 being based upon at least one factor of achievable flight plans or paths, the at least one factor of achievable flight plans exemplarily comprises at least one of the following factors: a factor related to one or more attributes associated with physical limitations of the aircraft 110; a factor related to one or more attributes associated with a limitation of at least one particular passenger; a factor related to one or more attributes associated with a limitation which is external to the aircraft 110; or the like.

Additionally, in some embodiments, the flight management system 112 is configured to filter (or configured to filter subject to an override by a user 111, 121, 131, or 141) a selectable space and/or an active area for the flight path selector (e.g., the vertical flight path selector 621 or the lateral flight path selector 1007 (as depicted in FIGS. 10-11 and described below)) based upon performance of operations associated with determining a region of the limit indicator 925.

Referring now to FIGS. 10-11, exemplary screenshots 1000, 1100 associated with exemplarily embodied methods for performing one or more operations of modifying a lateral navigation path or plan are depicted. Additionally, for example, the user interface system 113 (e.g., touchscreen display system 331) and flight management system 112 may be configured to handle and respond to user interactions (such as by user gestures or commands), may be configured to present graphical information and data, and may be configured to communicate with other on-board or off-board systems or devices, as described throughout.

Referring now to FIG. 10, an exemplary screenshot 1000 of a touch-GUI of a particular touchscreen display system 331 of an exemplary embodiment is depicted. As shown in FIG. 10, the exemplary screenshot 1000 represents the view of a touchscreen display 331 which a pilot may encounter under a scenario where the pilot is attempting to join a flight plan while flying a runway heading during a typical takeoff.

As depicted in FIG. 10, the particular touchscreen display system 331 is configured to display the lateral graphical representation 610 (as well as other information or other graphical representations). The lateral graphical representation 610 may include a multitude of information or data configured to be presented to the user. For example, the multitude of information or data of the lateral graphical representation 610 may include a current aircraft location 601, a waypoint 602, an active flight path or plan 603, heading information 611, a lateral flight path selector 1007, proposed flight paths or plans (e.g., a direct to course flight path or plan 1004, an optimum course flight path or plan 1005, a fastest intercept flight path or plan 1006, or the like), other graphically represented information or data, and the like.

As shown in FIG. 10, in some embodiments, the user interface system 113 (e.g., touchscreen display system 331) and flight management system 112 present multiple proposed flight paths or plans (e.g., a direct to course flight path or plan 1004, an optimum course flight path or plan 1005, a fastest intercept flight path or plan 1006, or the like) to the user 111, 121, 131, 141 (e.g., a pilot or remote pilot) to rejoin (e.g., intercept) the active flight path or plan 603 or to execute some other modified flight path or plan (e.g., a non-standard or "free set" flight path or plan). For example, one problem which often arises during takeoff is that most runway headings begin misaligned with respect to flight plans; that is, an immediate discontinuity between the runway heading and the flight plan occurs because the runway heading required for takeoff does not directly align with the flight plan. Embodiments provide solutions to this problem, among other benefits. In some embodiments, the flight management system 112, the auto-flight system, and/or the user interface system 113 are configured to dynamically output, present, and update the proposed flight paths or plans (e.g., a direct to course flight path or plan 1004, an optimum course flight path or plan 1005, a fastest intercept flight path or plan 1006, or the like) as the aircraft's position and/or orientation changes during flight.

Currently, most flights begin the same way; pilots are cleared to takeoff from the origin airport and fly a runway heading climbing until the aircraft reaches a particular altitude. The problem which typically arises is that most flight plans begin misaligned in relation to the requisite runway heading such that an immediate discontinuity with the flight plan ensues. Current aviation systems resolve this discontinuity between the runway heading and the flight plan through two disjointed pieces of automation: an auto-flight system and a flight management system. Pilots currently use the auto-flight system to fly a manual heading until cleared to their flight plan by air traffic control. Pilots typically then create a heading intercept to their flight plan and arm a lateral navigation ("LNAV") of the flight management system to engage when near the flight plan. Alternatively, the pilot could be cleared by air traffic control to a waypoint in their flight plan; however, this requires the pilot to go "heads down" and program an FMS modification, execute the change, and then arm the LNAV. These procedures require extensive training and understanding of the modes and transitions of current implemented, but disjointed, flight management systems and auto-flight systems. Furthermore, currently implemented flight management systems fail to accurately calculate time-to-destination and fuel estimates while flying in such heading modes. Therefore, in contemplated embodiments a proposed solution harmonizes the auto-flight system and flight management system by providing likely flight path options (e.g., proposed flight paths or plans 1004, 1005, 1006) to the pilot. For example, as shown in FIG. 10, the user 111, 121, 131, 141 is automatically presented with three selectable and dynamically updated proposed flight paths or plans 1004, 1005, 1006: a) a fastest intercept flight path or plan 1006; b) an optimum course flight path or plan 1005; and c) a direct-to course flight path or plan 1004. The system presents the optimum course flight path or plan 1005 as the default selected route.

In a particular exemplary embodiment, the optimum course flight path or plan 1005 is optimized based upon time, fuel, and comfort factors. Performance (e.g., based upon time and fuel factors) calculations are based on the selected route. In some embodiments, the system automatically displays multiple user selectable flight intercept lines/options (e.g., 1004, 1005, 1006) just after takeoff and preloads a particular flight path or plan (such as the optimum course flight path or plan 1005) as the default mode. Presentation of multiple user selectable flight intercept lines/options (e.g., proposed flight paths or plans 1004, 1005, 1006) allows for the user 111, 121, 131, or 141 (e.g., the pilot) to select and execute one of the proposed flight paths or plans 104, 105, 106 with a single button press or performance of a single sequence of one or more user gestures. Additionally, if automation determines that the aircraft 110 cannot intercept the first waypoint, the automation will auto-sequence the proposed flight paths or plans 1004, 1005, 1006 for a subsequent waypoint. For example, if air traffic control holds the aircraft on a heading which results in the aircraft overflying the first waypoint, the automation will auto-sequence to the next available waypoint of the active flight path or plan 603. Also, the pilot can alter the intercept heading for a flight plan to any heading desired or needed; that is, the pilot is not limited to selecting from the three proposed routes (e.g., 1004, 1005, 1006). While FIG. 10 refers to a takeoff situation, it is fully contemplated that the principles illustrated and described with respect to FIG. 10 apply to any flight plan offset or discontinuity condition or any other situation where a pilot or other user may select a proposed flight path or plan 1004, 1005, 1006 or may set a non-standard flight path or plan.

In further reference to FIG. 10, embodiments allow the user 111, 121, 131, or 141 to interact with touchscreen display system 331 to select a proposed flight path or plan (e.g., 1004, 1005, or 1006) or "free set" some other flight path or plan. For example, during takeoff, the user 111, 121, 131, or 141 may interact with the touchscreen display system 331 to set a heading intercept by dragging the lateral flight path selector 1007 to one of the dynamically updated proposed flight paths or plans (e.g., 1004, 1005, or 1006). Alternatively, the user 111, 121, 131, or 141 may "free set" a heading intercept to join the active flight path or plan 603 by dragging the lateral flight path selector 1007 to a point other than one of proposed flight path or plan 1004, 1005, 1006; while a user is manipulating (e.g., dragging) the lateral flight path selector 1007, a dynamically updated modified flight path or plan may be presented to the user 111, 121, 131, or 141 such that the user 111, 121, 131, or 141 can preview the dynamically updated modified flight path or plan.

As depicted in FIG. 10, in some embodiments, when the lateral vertical path selector 1007 is dragged, the proposed flight path or plan is temporarily shown. In some implementations, the optimum course flight path or plan 1005 is loaded by default; however, the user interface system 113 allows the user to select one of the other proposed courses (e.g., 1004 or 1006) or a free set flight path or plan. That is, in some embodiments, the lateral flight path selector 1007 is not bound to one of the proposed flight paths or plans; rather, the flight management system 112 (and/or the user interface system 113) is configured such that the lateral flight path selector 1007 may be adjusted to some other acceptable flight path or plan (e.g., a free set flight path or plan) by the user moving the lateral flight path selector 1007 to a point off of the proposed flight paths or plans. Additionally, the user 111, 121, 131, or 141 may tap on a particular proposed flight path or plan (e.g., one of 1004, 1005, or 1006) to set the particular proposed flight path or plan as the modified flight path or plan.

Additionally, in some embodiments, the user 111, 121, 131, or 141 can execute or cancel a proposed flight path or plan (e.g., 1004, 1005, or 1006) or a free set flight path or plan as described with reference to FIGS. 7-8, above. For example, in some embodiments, the user 111, 121, 131, or 141 can execute or cancel a proposed flight path or plan (e.g., 1004, 1005, 1006) or a free set flight path or plan by performing a gesture (e.g., a touch gesture) at or in proximity to the execute icon 732 or the cancel icon 731, respectively. In some embodiments, the user can perform a gesture (e.g., a touch gesture, an eye gesture, or the like), a command (e.g., a voice command), some combination thereof, or the like to execute or cancel a particular modified flight path or plan. Once the user executes a proposed flight path or plan (e.g., 1004, 1005, 1006) or executes a free set flight path or plan, the aircraft will join (or rejoin) the active flight path or plan 603 along the particular executed flight path or plan.

Additionally, in some embodiments, if the pilot or aircraft 110 overflies a particular waypoint (e.g., waypoint 602) of the active flight path or plan 603 while the aircraft is off-course, the flight management system 112 is configured to automatically route (e.g., sequence) a modified flight path or plan to a subsequent waypoint (e.g., a next waypoint) of the active flight path or plan 603.

Accordingly, once a user (e.g., a pilot) or aircraft 110 is cleared to join a particular flight path or plan (e.g., a user selected flight path or plan) by air traffic control, the user only needs to perform a gesture (e.g., a touch gesture), a single button press, or a command to execute the particular flight path or plan. Embodiments of the invention allow the pilot to bypass or forego performing a series of cumbersome operations as would be required using currently implemented avionics.

In further embodiments, navigation tasks are organized or decomposed into tactical navigation functions and strategic navigation functions. For example, tactical navigation functions include functions to modify flight plans, and strategic navigation functions include functions associated with rendering a flight map to be presented to a pilot (e.g., strategic navigation functions performed by a flight map application). As such, for example, performance of tactical navigation functions and strategic navigation functions concurrently allows a modified flight plan (e.g., by performing tactical navigation functions) to be displayed cohesively with respect to a rendered flight map (e.g., by performing strategic navigation functions). Additionally, the organization of navigation functions into tactical navigation functions and strategic navigation functions allows the user 111, 121, 131, or 141 to easily execute particular tactical or strategic navigation tasks (such as commonly used tasks) through a direct-execute single button press or single performance of a sequence of one or more gestures (e.g., touch gestures). In particular embodiments, tactical functions are performed by software applications, software modules, processes, services, or hardware components separate from strategic functions; however, it is fully contemplated that, in some embodiments, tactical navigation functions and strategic navigation functions may be performed by at least partially shared, linked, or partially coupled software applications, software modules, processes, services, or hardware components. For example, tactical navigation functions including functions to modify flight plans may be performed within a touchscreen display system 331 (e.g., a touchscreen flight control panel). In some embodiments, software or hardware of an aircraft (such as software or hardware components of a flight control panel, the user interface system 113, the FMS 112, or some combination thereof) may control tactical flight plan changes (e.g., direct-to flight plan changes or rejoin-flight-plan changes) and may harmonize the tactical flight plan changes with the flight map application. In some embodiments, the user interface system 112 (e.g., touchscreen display systems 331) is context driven so that only outputs of functions, which have some threshold (e.g., a predetermined threshold) amount of applicability or relevance to a particular flight condition or situation, are presented to a user (e.g., a pilot) at a particular time.

Referring now to FIG. 11, an exemplary screenshot 1100 of a touch-GUI of a particular touchscreen display system 331 of an exemplary embodiment is depicted. As shown in FIG. 11, embodiments of the invention allow a user 111, 121, 131, or 141 (e.g., a pilot, remote pilot, or aircraft controller) to perform a gesture (e.g., a touch gesture or eye gesture) or command (e.g., a voice command) to modify a flight path or plan by selecting, adding, or removing a particular waypoint 1002 to or from a particular flight path or plan (e.g., an active flight path or plan 603, a modified flight path or plan 1103, a proposed flight path or plan 1004, 1005, 1006, or the like).

Still referring to FIG. 11, for example, an exemplary embodiment of the invention allows the user 111, 121, 131, 141 to create a modified flight path or plan 1103 by adding a new waypoint 1102 by performing one or more touch gestures. As exemplarily shown in FIG. 11, the user can drag his or her finger from an aircraft symbol 601 (which represents the location of the aircraft 110) to the new waypoint 1102 (e.g., "snapping" to a waypoint symbol) to create the modified flight path or plan 1103. ("Snapping" may include setting a flight path selector (e.g., 621, 1107) at a waypoint symbol (e.g., 602, 1102) upon determining that a user has dragged (or dragged and free dropped) the flight path selector to a point within a predetermined proximity to a waypoint symbol.) As such, if one of the active flight path or plan's legs conflicts with the modified flight path or plan 1103 (e.g., a leg which would no longer be traveled if the modified flight path or plan 1103 is executed), the conflicting leg may be presented with a delete symbol 1108 (e.g., marked for deletion) pending execution of, cancellation of, or further modification to the modified flight path or plan 1103; in other embodiments, the conflicting leg of the modified flight path or plan 1103 may be automatically deleted from the modified flight path or plan. While FIG. 11 exemplarily depicts a user 111, 121, 131, or 141 snapping the flight plan to the new waypoint 1102, it is further contemplated that the user 111, 121, 131, or 141 may drag the flight path selector 1007 and free drop the flight path selector 1007 anywhere (including areas without navigation aids ("NAVAIDs", such as waypoints 1102, 602) or areas lacking displayed NAVAIDs). In the event that the system determines that the user 111, 121, 131, or 141 has performed a free drop, the system will create an additional waypoint and connect the flight plan to the created additional waypoint, and likewise, any conflicting leg of the modified flight path or plan may be marked for deletion, as described above.

In some embodiments, users can drag from and drop at any point; that is, users are not limited to dragging from points along active flight path legs or selecting/dragging the current aircraft location 601. Additionally, some embodiments allow a user 111, 121, 131, or 141 to perform waypoint-to-waypoint additions or modifications. For example, a user may select (e.g., by touching) a particular waypoint then drag the selected waypoint to a new point on the touchscreen display system 331 to create a modified flight path or plan. As a particular example, a user 111, 121, 131, 141 may drag from the BARTIN waypoint 602 to any other waypoint to create a new leg starting at the BARTIN waypoint 602. Furthermore, users may drag waypoints to connect to other published or unpublished three-dimensional routes or instrument procedures (such as Standard Instrument Departures ("SIDs"), Standard Terminal Arrival Routes ("STARs"), arrivals, or the like).

Furthermore, some embodiments allow a user 111, 121, 131, or 141 (e.g., a pilot, remote pilot, or air traffic controller) to perform a gesture (e.g., a touch gesture or eye gesture) or command (e.g., a voice command) to remove a particular waypoint from a particular flight path or plan by selecting the particular waypoint and executing a delete waypoint operation. As such, in some embodiments, upon deletion of the particular waypoint, the flight management system 112 is configured to automatically update attributes (such as connection legs, curvature, or the like) of the modified flight path or plan.

Additionally, in some embodiments, where the touchscreen display system 331 and/or the flight management system 112 are configured such that performance of a particular touch gesture (e.g., a finger swipe, or finger pinch) is set to pan a map or zoom in, the touchscreen display system 331 and/or the flight management system 112 may be configured such that performance of a unique, a semi-unique, or compound touch gesture can be set for the user to create a modified flight path or plan. For example, the unique, semi-unique, or compound touch gesture may include a multi-finger swipe touch gesture, a press-and-hold touch gesture, a press-and-hold-then-swipe touch gesture, a non-finger touch gesture, some combination thereof, or the like. Additionally, in some embodiments, a touchscreen display system 331 presents a graphical attribute to a user, wherein the graphical attribute (e.g., a symbol, a flashing attribute, a shade, a shape, a color, a size, a border, or the like) represents a particular gesture which needs to be performed to complete a particular function; for example, a graphical icon which can be manipulated through performance of a push-and-hold touch gesture may have a particular graphical attribute. Furthermore, in some embodiments the user interface system 113 (and a communicatively coupled flight management system 112) may receive and respond to touch-less user inputs (e.g., eye gestures, voice commands, or the like) and touch gestures.

Figure 12:
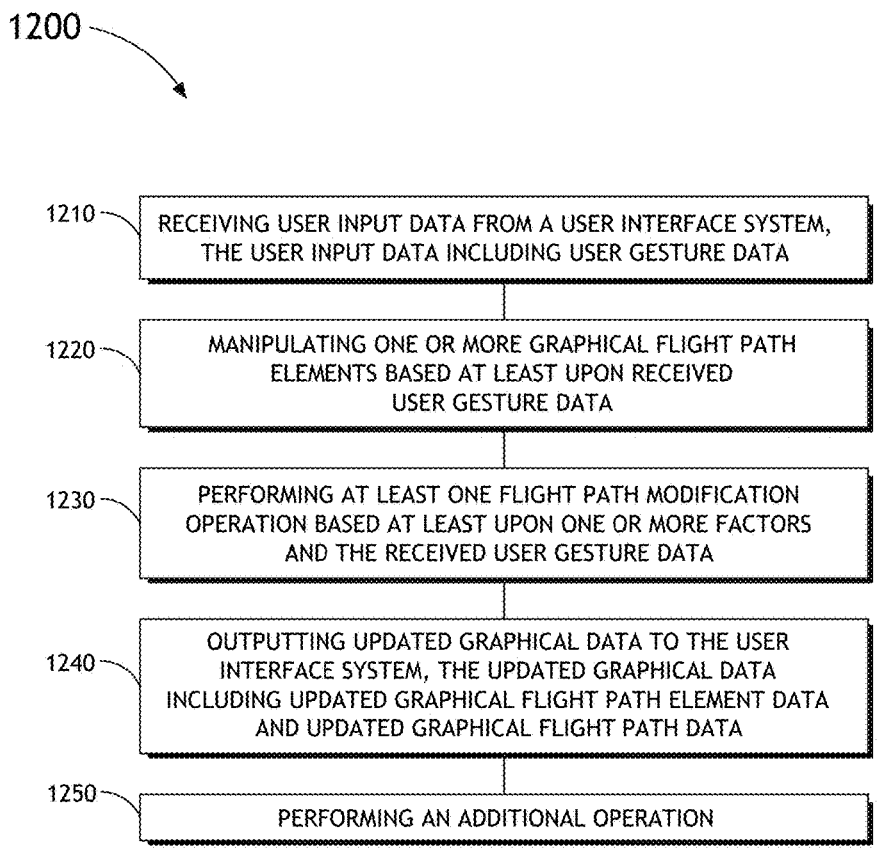
FIG. 12 shows a flow diagram of a method of some embodiments.

Referring now to FIG. 12, an embodiment of the invention includes a method 1200. It is contemplated that embodiments of the method 1200 can be performed by a computing device (such as a computing device of the aircraft 110 (e.g., the flight management system 112), a computing device of the communication station 130, a computing device of the data processing system 132, a computing device of the network operations center 122, a computing device connected to the network 124, a computing device of another vehicle 140, or the like); at least one component, integrated circuit, controller, processor, or module of a computing device; software or firmware executed on the computing device; other computing devices; other computer components; or on other software, firmware, or middleware of a system topology 100; some combination thereof; or the like. The method 1200 can include any or all of steps 1210, 1220, 1230, 1240 and/or 1250, and it is contemplated that the method 1200 includes additional steps or operations as disclosed throughout, but not explicitly set forth in this paragraph. Further, it is fully contemplated that the steps of the method 1200 can be performed concurrently, sequentially, or in a non-sequential order. Likewise, it is fully contemplated that the method 1200 can be performed prior to, concurrently, subsequent to, or in combination with the performance of one or more steps or operations disclosed throughout.

Embodiments of the method 1200 include a step 1210, wherein the step 1210 comprises receiving user input data from a user interface system, the user input data including user gesture data. Embodiments of the method 1200 also include a step 1220, wherein the step 1220 comprises manipulating one or more graphical flight path elements based at least upon received user gesture data. In some embodiments, the one or more graphical flight path elements may include a lateral flight path selector, a vertical flight path selector, a waypoint, or the like. Embodiments of the method 1200 further include a step 1230, wherein the step 1230 comprises performing at least one flight path modification operation based at least upon one or more factors and the received user gesture data. Additionally, embodiments of the method 1200 include a step 1240, wherein the step 1240 comprises outputting updated graphical data to the user interface system, the updated graphical data including updated graphical flight path element data and updated graphical flight path data. In some embodiments, the user interface receives the updated graphical flight path data and graphically presents information to a particular user in substantially real time. Some embodiments of the method 1200 further include a step 1250, wherein the step 1250 comprises performing at least one additional operation, such as disclosed throughout.

As described throughout, embodiments of the invention include a user interface system 113 and/or a flight management system 112, which reduce the number of operations required to be performed by a pilot to complete a flight plan modification, and additionally, the graphical nature of the interface is more intuitive for the pilot to visualize as compared to currently implemented user interfaces and flight management systems.

In the present disclosure, the methods disclosed may be implemented as sets of instructions or software readable, recognizable, or detectable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method, comprising:
receiving at least one proposed flight path;
displaying the at least one proposed flight path, graphical flight path elements, and a limit indicator to a user, the graphical flight path elements associated with the at least one proposed flight path, the graphical flight path elements including a lateral flight path selector and a vertical flight path selector, the limit indicator indicating a region that contains points of unacceptable flight paths;
receiving user input data from a user interface system, the user input data including user gesture data, the user gesture data being associated with one or more detected user gestures to move at least one of the lateral flight path selector or the vertical flight path selector to a point within the region indicated by the limit indicator;
sending, to an off-board source, a request to authorize a flight path through the region indicated by the limit indicator;
receiving, from the off-board source, authorization for the flight path through the region indicated by the limit indicator;
manipulating the graphical flight path elements associated with the at least one proposed flight path based at least upon the received user gesture data;
performing at least one flight path modification operation on the at least one proposed flight path based at least upon factors and the received user gesture data, the factors including a plurality of constraints including a cost effect to a flight plan of another aircraft and at least one of a rate of cabin pressure differential change, a degree of vertical inclination, or a degree of lateral roll; and
outputting updated graphical data to the user interface system, the updated graphical data being in response to manipulating the graphical flight path elements and the at least one flight path modification operation, the updated graphical data including updated graphical flight path element data and updated graphical flight path data.

2. The method of claim 1, wherein the user interface system includes a touchscreen display configured to detect user touch gestures, and wherein the user gesture data includes user touch gesture data.

3. The method of claim 1, wherein manipulating the graphical flight path elements associated with the at least one proposed flight path based at least upon the received user gesture data further comprises:
manipulating the vertical flight path selector associated with the at least one proposed flight path based at least upon the received user gesture data.

4. The method of claim 1, wherein manipulating the graphical flight path elements associated with the at least one proposed flight path based at least upon the received user gesture data further comprises:
manipulating the vertical flight path selector or the lateral flight path selector associated with the at least one proposed flight path based at least upon the received user gesture data.

5. The method of claim 1, wherein the graphical flight path elements include a waypoint, wherein manipulating the graphical flight path elements associated with the at least one proposed flight path based at least upon the received user gesture data further comprises:
manipulating the waypoint associated with the at least one proposed flight path based at least upon the received user gesture data.

6. The method of claim 1, wherein the at least one proposed flight path is at least two proposed flight paths, the at least two proposed flight paths including an optimized flight path, the method further comprising:
suggesting the optimized flight path based at least upon the factors.

7. The method of claim 1, wherein the user gesture data is further associated with at least one of the following: performance of a touch gesture to join or rejoin a flight plan; or performance of a touch gesture to select a particular proposed flight path of the at least one proposed flight path.

8. The method of claim 1, further comprising:
determining that a manipulation of the one or more graphical flight path elements results in at least one of a predetermined proximity to a violation of a constraint of the plurality of constraints or the violation of the constraint of the plurality of constraints based at least upon the received user gesture data and the factors.

9. The method of claim 8, wherein outputting updated graphical data to the user interface system, the updated graphical data being in response to manipulating the graphical flight path elements and the at least one flight path modification operation, the updated graphical data including updated graphical flight path element data and updated graphical flight path data further comprises:
outputting updated graphical data to the user interface system, the updated graphical data including the updated graphical flight path element data, the updated graphical flight path data, and limit indicator data.

10. The method of claim 1, wherein one or more of the factors is a goal-based factor.

11. The method of claim 1, further comprising:
performing an additional operation.

12. The method of claim 1, further comprising:
performing an operation to indicate a conflicting portion of a particular flight path of the at least one proposed flight path for deletion.

13. The method of claim 1, further comprising:
performing a deletion operation to a particular flight path of the at least one proposed flight path.

14. The method of claim 1, further comprising:
receiving a notification to at least one of execute or cancel a modified flight plan upon outputting the updated graphical data.

15. The method of claim 1, wherein receiving the at least one proposed flight path further comprises:
receiving at least two proposed flight paths including a fastest intercept flight path, wherein the fastest intercept flight path is a fastest flight path to intercept an active flight plan.

16. A system, comprising:

a memory; and at least one processor, one or more of the at least one processor being coupled to the memory, wherein the at least one processor is configured for executing instructions for:

receiving at least one proposed flight path;

outputting the at least one proposed flight path, graphical flight path elements, and a limit indicator to a user interface system for presentation to a user, the graphical flight path elements associated with the at least one proposed flight path, the graphical flight path elements including a lateral flight path selector and a vertical flight path selector, the limit indicator indicating a region that contains points of unacceptable flight paths;

receiving user input data from the user interface system, the user input data including user gesture data, the user gesture data being associated with one or more detected user gestures to move at least one of the lateral flight path selector or the vertical flight path selector to a point within the region indicated by the limit indicator;

sending, to an off-board source, a request to authorize a flight path through the region indicated by the limit indicator;

receiving, from the off-board source, authorization for the flight path through the region indicated by the limit indicator;

manipulating the graphical flight path elements associated with the at least one proposed flight path based at least upon the received user gesture data;

performing at least one flight path modification operation on the at least one proposed flight path based at least upon factors and the received user gesture data, factors including a plurality of constraints including a cost effect to a flight plan of another aircraft and at least one of a rate of cabin pressure differential change, a degree of vertical inclination, or a degree of lateral roll; and outputting updated graphical data to the user interface system, the updated graphical data being in response to manipulating the graphical flight path elements and the at least one flight path modification operation, the updated graphical data including updated graphical flight path element data and updated graphical flight path data.

17. The system of claim 16, wherein the one or more of the at least one processor comprises one or more processors of a flight management system of an aircraft.

\* \* \* \* \*